United States Patent [19]

Nagasawa et al.

[11] Patent Number: 5,214,730
[45] Date of Patent: May 25, 1993

[54] MULTIFIBER OPTICAL CONNECTOR PLUG WITH LOW REFLECTION AND LOW INSERTION LOSS

[75] Inventors: Shinji Nagasawa; Fumihiro Ashiya; Toshiaki Satake, all of Ibaraki, Japan

[73] Assignee: Nippon Telegraph and Telephone Corporation, Tokyo, Japan

[21] Appl. No.: 880,061

[22] Filed: May 7, 1992

[30] Foreign Application Priority Data

| May 13, 1991 | [JP] | Japan | 3-137238 |
| May 24, 1991 | [JP] | Japan | 3-149681 |
| Jul. 29, 1991 | [JP] | Japan | 3-211572 |
| Jul. 29, 1991 | [JP] | Japan | 3-211573 |

[51] Int. Cl.$^5$ .................................. G02B 6/38
[52] U.S. Cl. ........................... 385/59; 385/71; 385/77
[58] Field of Search .............. 385/59, 60, 75, 77, 385/78, 85, 71

[56] References Cited

U.S. PATENT DOCUMENTS

| 4,341,439 | 7/1982 | Hodge | 385/59 |
| 4,597,631 | 7/1986 | Flores | 385/59 |
| 4,850,670 | 7/1989 | Mathis et al. | 385/72 |
| 5,133,032 | 7/1992 | Salter et al. | 385/60 |
| 5,136,681 | 8/1992 | Takahashi | 385/40 |

FOREIGN PATENT DOCUMENTS

| 0249237 | 6/1987 | European Pat. Off. |
| 0253426 | 6/1987 | European Pat. Off. |
| 9102994 | 8/1990 | World Int. Prop. O. |

OTHER PUBLICATIONS

S. Nagasawa et al.; A High-Performance Single-Mode Multifiber Connector Using Oblique and Direct Endface Contact between Multiple Fibers Arranged in a Plastic Ferrule; IEEE Photonics Technology Letters vol. 3, No. 10, Oct. 1991, New York, pp. 937-939.

W. C. Young et al.; Loss and Reflectance of Standard Cylindrical-Ferrule Single Mode Connectors Modified by Polishing a 10° Oblique Endface Angle; IEEE Photonics Technology Letters vol. 1, No. 12, Dec. 1989, pp. 461-463.

Sakate et al.; Ultra High Density 50-Fiber Connector; The Transactions of the I.E.C.E. of Japan E70, Jul. 1987, No. 7, Tokyo, Japan, pp. 621-622.

Primary Examiner—Frank Gonzalez
Attorney, Agent, or Firm—Allegretti & Witcoff, Ltd.

[57] ABSTRACT

A multifiber optical connector plug capable of realizing low reflection and low insertion loss, without using the refractive index matching material. The multifiber optical connector plug includes a connector plug member made of a plastic material, having a connecting facet on which endfaces of the optical fibers to be connected with other optical fibers are arranged in a transverse direction between the guide pin insertion holes, with the endfaces of the optical fibers projecting out of the connecting facet, the connecting facet being inclined with respect to an axial direction along optical axes of the optical fibers by an angle which is larger than a total reflection critical angle of light beams transmitted through the optical fibers. The connecting facet may have a flat surface shape or a convex ellipsoidal surface shape. A multifiber optical connector can be formed by a pair of such multifiber optical connector plugs with spring member for pressing the multifiber optical connector plugs toward each other in the axial direction and guide pins for aligning the multifiber optical connector plugs.

23 Claims, 23 Drawing Sheets

F I G. 17
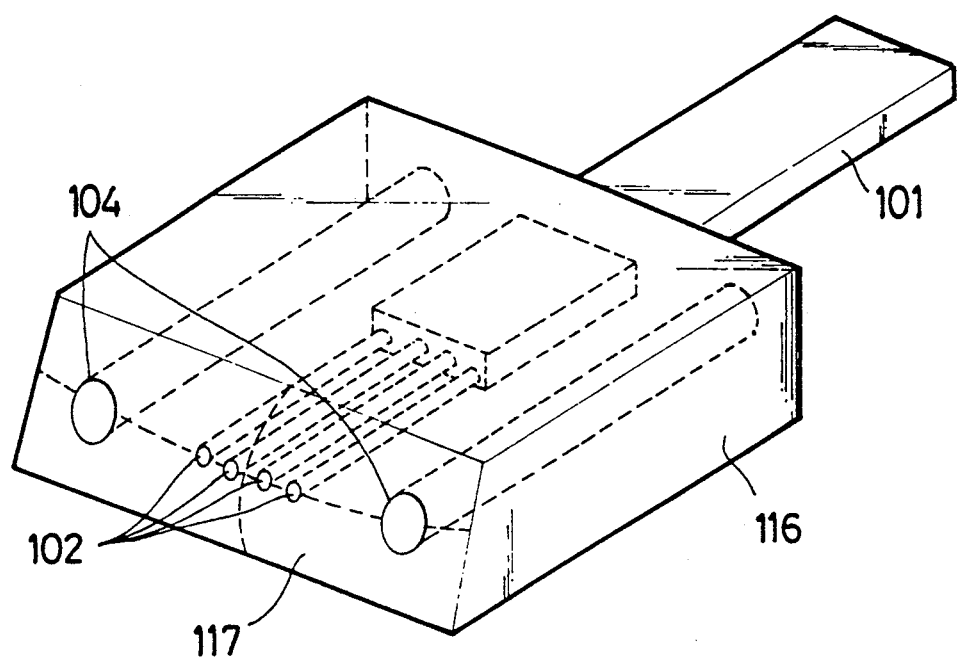

MULTIFIBER OPTICAL CONNECTOR PLUG WITH LOW REFLECTION AND LOW INSERTION LOSS

BACKGROUND OF THE INVENTION

1. Field of the Invention

The present invention relates to a multifiber optical connector plug to be connected with another multifiber optical connector plug, so as to connect a pair of multifiber optical cores.

2. Description of the Background Art

A first example of a conventionally known multifiber optical connector plug is shown in FIG. 1, in which a connector plug member 3 houses a plurality of transversely arranged optical fibers 2 projecting out of the end of an optical fiber ribbon 1 and has a pair of guide pin insertion holes 4 with the transversely arranged optical fibers 2 located therebetween, while a connecting facet 5 of the connector plug member 3 has a flat surface perpendicular to the optical axes of the optical fibers 2, where the perpendicular flat surface of the connecting facet 5 has been obtained by the application of a perpendicular polishing. This multifiber optical connector plug of FIG. 1 also includes a clamp spring member 7 for clamping one connector plug member 3 and another connector plug member 3' together when they are connected together.

As shown in FIG. 2, in connecting two multifiber optical cores, the connecting facet 5 of one connector plug member 3 is brought face to face with a connecting facet 5' of another connector plug member 3', with the alignment of the connector plug member 3 and 3' provided by guide pins 6 inserted into the guide pin insertion holes 4 and 4' of the connector plug members 3 and 3'. The connector plug members 3 and 3' are then pressed against each other in an axial direction by attaching the clamp spring member 7 so as to maintain the connected state with a proper alignment.

Here, however, the connecting facets 5 and 5' of the connector plug members 3 and 3' have the microscopic angular errors produced in the perpendicular polishing process, so that there is an air clearance between the connecting facets 5 and 5' when the connector plug members 3 and 3' are connected together straightforwardly. Such a clearance between the connecting facets 5 and 5' could cause the Fresnel reflection of the light beams transmitted through the optical fibers, which in turn causes the deterioration of the emission characteristic of the light source due to the light beams reflected toward the light source, as well as the increase of the connection loss due to the presence of the Fresnel reflection.

For this reason, as shown in FIG. 2, the formation of the clearance between the connecting facets 5 and 5' has been prevented conventionally, by applying a refractive index matching material 8 such as a silicone grease on the connecting facets 5 and 5' before the connecting facets 5 and 5' are brought into contact, so that the refractive index matching material 8 can fill in the clearance between the connecting facets 5 and 5' when the connector plug members 3 and 3' are connected together.

However, this type of a conventional multifiber optical connector plug has been associated with the problems that the tedious and time consuming work of the cleaning of the connecting facets 5 and 5' and the application of the refractive index matching material 7 onto the connecting facets 5 and 5' are required at a time of reconnection or switching.

Also, this configuration of FIG. 2 has been associated with the problem that the angular displacement between the connector plug members 3 and 3' is easily caused by a large impact applied to the assembled connector plug members 3 and 3' such as the impact due to the dropping of the connector, and this angular displacement significantly affects the connection loss of the connector.

A second example of a conventionally known multifiber optical connector plug is shown in FIG. 3, in which a connector plug member 9 houses a plurality of transversely arranged optical fibers 2 projecting out of the end of an optical fiber ribbon 1 and has a pair of guide pin insertion holes 10 with the transversely arranged optical fibers 2 located therebetween, while a connecting facet 11 of the connector plug member 3 has a protruded portion 12 provided at a region surrounding the transversely arranged optical fibers 2, where the protruded protion 12 has a flat end surface 13 perpendicular to the optical axes of the optical fibers 2, which has been obtained by the application of a perpendicular polishing. This multifiber optical connector plug of FIG. 3 also includes a clamp spring member 7 for clamping one connector plug member 9 and another connector plug member 9' together when they are connected together. In this configuration, the connector plug member 9 is usually formed by a plastic material.

As shown in FIG. 4, in connecting two multifiber optical cores, the flat end surface 13 of the protruded portion 12 of one connector plug member 9 is brought face to face with a flat end surface 13' of the protruded portion 12' of another connector plug member 9', with the alignment of the connector plug members 9 and 9' provided by the guide pins 6 inserted into the guide pin insertion holes 10 and 10' of the connector plug members 9 and 9'. The connector plug members 9 and 9' are then pressed against each other in an axial direction by attaching the clamp spring member 7 so as to maintain the connected state with a proper alignment.

In this configuration of FIG. 3, because the protruded portion 12 has the flat end surface 13 which has an area smaller than that of the entire connecting facet 11, the angular errors produced in the perpendicular polishing process can be made substantially smaller compared with the configuration of FIG. 1 described above, and in addition the elastic plastic material is used for for the connector plug members 9 and 9', so that it becomes possible to obtain the direct contact between the endfaces of the optical fibers 2, without using the refractive index matching material.

Here, however, each of the endfaces of the optical fibers 2 is covered by a high refractive index layer of a microscopic scale which is produced as a by-product of the polishing process. As a result, a part of the light beams transmitted through the optical fibers 2 is reflected toward the light source, and for this reason the reflection is limited to a range of approximately −40 to −35 dB, so that it is not applicable to an analog optical transmission system which requires a low reflection characteristic of a reflection below −50 dB.

Moreover, the configuration of FIG. 4 has been associated with the problem that the angular displacement between the connector plug members 9 and 9' is easily caused by an external force exerted in a direction of thickness of the connector plug members or in a direction of width of the connector plug members, because the large part of the connecting facet 11 around the guide pin insertion holes 10 in the connector plug member 9 does not make contact with the connecting facet 11' of the mated connector plug member 9'. As a result, the direct contact between the endfaces of the optical fibers 2 could easily be lost by the external force exerted at a time of connection and reconnection, and the clearance could easily be produced between the flat end surfaces 13 and 13' of the protruded portions 12 and 12' of the connector plug members 9 and 9'. For this reason, it has been difficult for this type of a conventional multifiber optical connector plug to achieve the stable reflection characteristic and connection loss.

Also, just as in the configuration of FIG. 2 described above, this configuration of FIG. 4 has been associated with the problem that the angular displacement between the connector plug members 9 and 9' is easily caused by a large impact applied to the assembled connector plug members 9 and 9' such as the impact due to the dropping of the connector, and this angular displacement significantly affects the connection loss of the connector while possibly also producing the clearance between the flat end surfaces 13 and 13' which causes the Fresnel reflection.

Now, it is noted that the problems described above for the multifiber optical connector plug are equally pertinent to a single fiber optical connector plug, so that a clearance formed between the connecting facets of the connector plug members in a connected state could cause the Fresnel reflection of the light beams transmitted through the optical fibers, and this in turn causes the deterioration of the emission characteristic of the light source due to the light beams reflected toward the light source, as well as the increase of the connection loss due to the presence of the reflected light beams. In a case of a single fiber optical connector plug, this problem has been coped by the following conventionally known configurations.

A first example of a conventionally known single fiber optical connector plug is shown in FIG. 5, in which a connector plug member 16 in a substantially cylindrical shape houses an optical fiber 15 projecting out of the end of an optical fiber cable 14, while a connecting facet 17 of this connector plug member 16 has a convex spherical surface symmetrical with respect to the optical axis of the optical fiber 15, where this spherical surface of the connecting facet 17 has been obtained by the successive application of a perpendicular polishing followed by a spherical polishing using the perpendicularly polished surface as a reference surface. In this configuration, the connector plug member 16 is usually formed by a ceramic material.

As shown in FIG. 5, in connecting two optical fibers, the connecting facet 17 of one connector plug member 16 is inserted into one opening of a guide sleeve 18 and brought face to face with a connecting facet 17' of another connector plug member 16' which is inserted into another opening of the guide sleeve 18, and the connector plug members 16 and 16' are pressed against each other in an axial direction by externally provided springs or other pressing means, such that the alignment of the connector plug members 16 and 16' is achieved by the guide sleeve 18, and a circular contact region is formed on the convex spherical surfaces of the connecting facets 17 and 17'.

The diameter of this circular contact region can be determined from the Young's modulus of the ceramic material used for the connector plug members 16 and 16', the radius of curvature of the spherical surface of the connecting facets 17 and 17', and the force exerted in the axial direction, according to the Hertz formula. As a typical case, when the ceramic material used is an alumina ceramic which has the Young's modulus equal to 370 GPa, the radius of curvature of the spherical surface is 60 mm, and the force exerted in the axial direction is 1 Kgf, the diameter of the circular contact region will be approximately 0.2 mm.

When such a circular contact region is formed, the endfaces of the optical fibers 15 and 15' located at the centers of this circular contact region are put into a direct contact with each other, so that the Fresnel reflection due to the clearance can be eliminated.

However, just as in the configuration of FIG. 3 described above, each of the endfaces of the optical fibers 15 and 15' is covered by a high refractive index layer of a microscopic scale which is produced as a by-product of the polishing process. As a result, a part of the light beams transmitted through the optical fibers 15 and 15' is reflected toward the light source, and for this reason the reflection is limited to a range of approximately −40 to −35 dB, so that it is not applicable to an analog optical transmission system which requires a low reflection characteristic of a reflection below −50 dB.

Moreover, the configuration of FIG. 5 has been associated with the problem that it has been difficult to adapt this configuration for a case of multifiber optical connector plug, because the circular contact region formed at a time of connection is too small to secure the direct contacts for a plurality of optical fibers, and also because it is technically difficult to position a plurality of optical fibers in the cylindrical connector plug member at high accuracy.

A second example of a conventionally known single fiber optical connector plug is shown in FIG. 6, in which a connector plug member 19 in a substantially cylindrical shape houses an optical fiber 15 projecting out of the end of an optical fiber cable 14, while a connecting facet 20 of this connector plug member 19 has an oblique surface which is inclined with respect to the optical axis of the optical fiber 15 by an angle θ which is larger than the total reflection critical angle of the light beam transmitted through the optical fiber 15, where this oblique surface of the connecting facet 20 has been obtained by the application of an oblique polishing. In this configuration, the connector plug member 19 is usually formed by a ceramic material.

As shown in FIG. 6, in connecting two optical fibers, the connecting facet 20 of one connector plug member 19 is inserted into one opening of a guide sleeve 18 and brought face to face with a connecting facet 20' of another connector plug member 19' which is inserted into another opening of the guide sleeve 18, such that the alignment of the connector plug members 19 and 19' is achieved by the guide sleeve 18. In this configuration, the endfaces of the optical fibers 15 and 15' make a contact at oblique surfaces inclined at the angle θ.

Here, however, the connecting facets 20 and 20' of the connector plug members 19 and 19' have a clearance formed therebetween for the following reasons. First, the connecting facets 20 and 20' of the connector plug members 19 and 19' have the microscopic angular errors produced in the oblique polishing process, and these angle errors cannot be absorbed by the relatively hard and less elastic ceramic material from which the connector plug members 19 and 19' are made. Secondly, the angular displacement between the cylindrical connector plug members 19 and 19' can be easily caused in a circumferential direction. Thirdly, the ceramic material from which the connector plug members 19 and 19' are made is harder than the quartz from which the optical fibers 15 and 15' are made, so that the endfaces of the optical fibers 15 and 15' have concave shapes because the optical fibers 15 and 15' are polished by larger extent compared with the connector plug members 19 and 19' at a time of the oblique polishing. Also, just as in the configurations described above, each of the endfaces of the optical fibers 15 and 15' is covered by a high refractive index layer of a microscopic scale which is produced as a by-product of the polishing process.

Nevertheless, because of the contact at oblique surfaces inclined at the angle $\theta$ which is larger than the total reflection critical angle of the light beams, the reflection due to the clearance formed between the connecting facets 20 and 20' as well as the reflection due to the high refractive index layer are the reflections at the oblique surfaces inclined at the angle $\theta$, so that the reflected beams are not transmitted toward the light source, and consequently it is possible in this configuration of FIG. 6 to realize the low reflection characteristic of a reflection below $-50$ dB.

On the other hand, in this configuration of FIG. 6, the presence of the clearance between the connecting facets 20 and 20' could cause the Fresnel reflection of the light beams transmitted through the optical fibers, so that it is still associated with the increase of the connection loss due to the presence of the Fresnel reflection.

Moreover, the configuration of FIG. 6 has been associated with the problem that it has been difficult to adapt this configuration for a case of multifiber optical connector plug, because it is technically difficult to position a plurality of fibers in the cylindrical connector plug member at high accuracy, just as in the configuration of FIG. 5 described above.

There is also a third example of a conventionally known multifiber optical connector plug shown in FIG. 7, in which the feature of the single fiber optical connector plug of FIG. 6 has been adapted for a case of multifiber core. In this configuration of FIG. 7, a connector plug member 21 formed by a silicon material comprises upper and lower halves to be assembled together, where each of the upper and lower halves has a plurality of V shaped grooves formed thereon, and houses a plurality of transversely arranged optical fibers 2 projecting out of the end of an optical fiber ribbon 1 along the V-shaped grooves formed on the upper and lower halves, while a connecting facet 22 of the connector plug member 21 has an oblique surface which is inclined with respect to the optical axis of the optical fibers 2 by an angle $\theta$ which is larger than the total reflection critical angle of the light beam transmitted through the optical fibers 2, where this oblique surface of the connecting facet 21 has been obtained by the application of an oblique polishing.

As shown in FIG. 8, in connecting two multifiber optical cores, the connecting facet 22 of one connector plug member 21 is inserted into one opening of a guide sleeve 23 and brought face to face with a connecting facet 22' of another connector plug member 21' which is inserted into another opening of the guide sleeve 23, such that the alignment of the connector plug members 21 and 21' is achieved by arc shaped spring members 24 provided inside the guide sleeve 23. In this configuration, the endfaces of the optical fibers 2 and 2' make a contact at oblique surfaces inclined at the angle $\theta$.

Here, however, the connecting facets 22 and 22' of the connector plug members 21 and 21' have a clearance formed therebetween for the following reasons. First, the connecting facets 22 and 22' of the connector plug members 21 and 21' have the microscopic angular errors produced in the oblique polishing process, and these angular errors cannot be absorbed by the relatively hard and less elastic silicon material from which the connector plug members 21 and 21' are made. Secondly, the silicon material from which the connector plug members 21 and 21' are made is harder than the quartz from which the optical fibers 2 and 2' are made, so that the endfaces of the optical fibers 2 and 2' have concave shapes because the optical fibers 2 and 2' are polished by larger extent compared with the connector plug members 21 and 21' at a time of the oblique polishing. Also, just as in the configurations described above, each of the endfaces of the optical fibers 2 and 2' is covered by a high refractive index layer of a microscopic scale which is produced as a by-product of the polishing process.

In this configuration of FIG. 7, just as in the single fiber optical connector plug of FIG. 6, because of the contact at oblique surfaces inclined at the angle $\theta$ which is larger than the total reflection critical angle of the light beams, the reflection due to the clearance formed between the connecting facets 22 and 22' as well as the reflection due to the high refractive index layer are the reflections at the oblique surfaces inclined at the angle $\theta$, so that the reflected beams are not transmitted toward the light source, and consequently it is possible in this configuration of FIG. 7 to realize the low reflection characteristic of a reflection below $-50$ dB.

On the other hand, in this configuration of FIG. 7, the presence of the clearance between the connecting facets 22 and 22' could cause the Fresnel reflection of the light beams transmitted through the optical fibers, so that it is still associated with the increase of the connection loss due to the presence of the Fresnel reflection.

It is also possible in this configuration of FIG. 7 to apply the refractive index matching material such as a silicone grease on the connecting facets 22 and 22' before the connecting facets 22 and 22' are brought into contact, so that the refractive index matching material can fill in the clearance between the connecting facets 22 and 22' when the connector plug members 21 and 21' are connected together, just as in the configuration of FIG. 1 described above.

However, as already mentioned above, such an application of the refractive index matching material has been associated with the problems that the tedious and time consuming work of the cleaning of the connecting facets 22 and 22' and the application of the refractive index matching material onto the connecting facets 22 and 22' are required at a time of reconnection or switching, so that such an improvement of the connection loss using the refractive index matching material has been applicable only to the very limited circumstances for which very little reconnection or switching operations are required.

There is also an example of a conventionally known multifiber optical connector plug assembly shown in FIG. 9 and FIG. 10, in which the connector plug member similar to that shown in FIG. 1 described above is used as a multifiber connector ferrule 3.

In this configuration of FIGS. 9 and 10, the multifiber optical connector plug assembly comprises: a multifiber connector ferrule 3 housing a plurality of transversely arranged optical fibers 2 projecting out of the end of an optical fiber ribbon 1 and having a pair of guide pin insertion holes 4 with the transversely arranged optical fibers 2 located therebetween; a guide pin stopping member 25 provided behind the multifiber connector ferrule 3 for preventing the guide pins inserted into the guide pin insertion holes 4 from projecting out from the multifiber connector ferrule 3; a spring member 26 provided behind the guide pin stopping member 25 for pressing the multifiber connector ferrule 3 against a mated multifiber connector ferrule in an axial direction; and a front housing 27 and a rear housing 28 for integrally housing the multifiber connector ferrule 3, the guide pin stopping member 25, and the spring member 26 together.

As shown in FIG. 11, in connecting two multifiber optical connector plug assemblies to form a multifiber optical connector, the guide pins 6 are inserted into the guide pin insertion holes 4 of one multifiber optical connector plug assembly A first, and then this multifiber optical connector plug assembly A is inserted into one opening of an adaptor B until hook members 30 provided on the adaptor B are engaged with groove portions 29 formed on the front housing 27 of this multifiber optical connector plug assembly A.

Then, another multifiber optical connector plug assembly A' is inserted into another opening of the adaptor B until the hook members 30' provided on the adaptor B are engaged with groove portions 29' formed on the front housing 27' of this another multifiber optical connector plug assembly A'. Here, the guide pins 6 are also inserted into the guide pin insertion holes 4' of this another multifiber optical connector plug assembly A', such that the alignment of the optical fibers housed inside the multifiber optical connector plug assemblies A and A' is provided by guide pins 6.

In a case of reconnection or switching, the detachment of the multifiber optical connector plug assemblies is achieved by releasing the engagement of the hook members 30 and 30' of the adaptor B with the groove portions 29 and 29' of the multifiber optical connector plug assemblies A and A', and pulling the multifiber optical connector plug assemblies A and A' out of the adaptor B.

Now, in this configuration, the guide pins 6 inserted into the guide pin insertion holes 4 and 4' are commonly provided for both of the multifiber optical connector plug assemblies A and A' and not fixed to either one of the guide pin insertion holes 4 and 4'. For this reason, there has been cases in which the guide pins 6 have dropped off the multifiber optical connector plug assemblies A and A', which severely damaged the maneuverability of this multifiber optical connector plug assembly in the connection and reconnection operations.

It is to be noted here that the fixing of the guide pins 6 to either one of the guide pin insertion holes 4 or 4' by means of adhesive or other fixing means does not solve this problem of the maneuverability just mentioned, because of the following reasons.

First of all, if such a fixing of the guide pins 6 is employed, the multifiber optical connector plug assemblies would have to come into two forms of a male plug assembly having the guide pins 6 fixed and a female plug assembly without the guide pins 6, so that each plug assembly would have a predetermined specific connection orientation, and this can severely limit the wide applicability of the plug assembly in a sense that a given plug assembly is not necessarily be always capable of being connected with another arbitrary plug assembly.

Secondly, if such a fixing of the guide pins 6 is employed, it would be difficult to provide a sufficient cleaning of the endface of the plug assembly required at a time of the connection and reconnection operation, especially for the male plug assembly having the guide pins 6 fixed thereon.

SUMMARY OF THE INVENTION

It is therefore an object of the present invention to provide a multifiber optical connector plug capable of realizing a stable connection characteristic of low reflection and low insertion loss, without using the refractive index matching material.

It is another object of the present invention to provide a multifiber optical connector plug capable of realizing an improved maneuverability in the connection and reconnection operations.

According to one aspect of the present invention there is provided a multifiber optical connector plug, comprising: a plurality of optical fibers; and a connector plug member made of a plastic material, having a connecting facet on which endfaces of the optical fibers to be connected with other optical fibers are arranged with the endfaces of the optical fibers projecting out of the connecting facet, the connecting facet being inclined with respect to an axial direction along optical axes of the optical fibers by an angle which is larger than a total reflection critical angle of light beams transmitted through the optical fibers.

According to another aspect of the present invention there is provided a multifiber optical connector plug, comprising: a plurality of optical fibers; and a connector plug member made of an elastic material, having a connecting facet on which endfaces of the optical fibers to be connected with other optical fibers are arranged, the connecting facet being inclined with respect to an axial direction along optical axes of the optical fibers by an angle which is larger than a total reflection critical angle of light beams transmitted through the optical fibers, and the connecting facet having a convex ellipsoidal surface shape.

According to another aspect of the present invention there is provided a multifiber optical connector, comprising: a pair of multifiber optical connector plugs, each multifiber optical connector plug comprising: a plurality of optical fibers; and a connector ferrule having a connecting facet on which endfaces of the optical fibers to be connected with other optical fibers are arranged with the endfaces of the optical fibers projecting out of the connecting facet, the connecting facet being inclined with respect to an axial direction along optical axes of the optical fibers by an angle which is larger than a total reflection critical angle of light beams transmitted through the optical fibers; spring means for pressing said pair of multifiber optical connector plugs toward each other in the axial direction; and guide pins for aligning said pair of multifiber optical connector plugs.

Other features and advantages of the present invention will become apparent from the following description taken in conjunction with the accompanying drawings.

BRIEF DESCRIPTION OF THE DRAWINGS

FIG. 17 is a perspective view of a third embodiment of a multifiber optical connector plug according to the present invention.

DETAILED DESCRIPTION OF THE PREFERRED EMBODIMENTS

Figure 12:
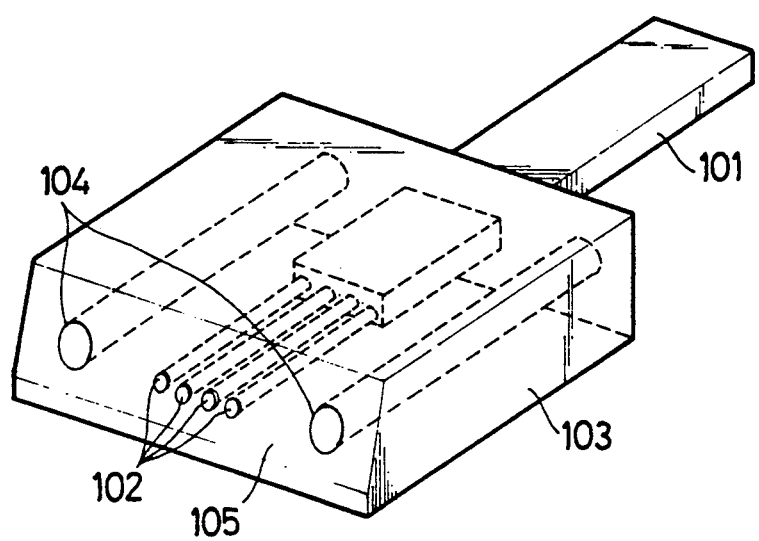
FIG. 12 is a perspective view of a first embodiment of a multifiber optical connector plug according to the present invention.
Figure 13:
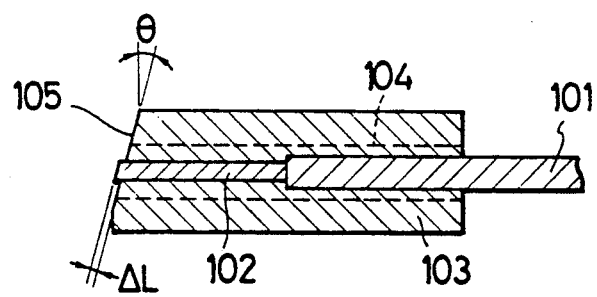
FIG. 13 is a cross sectional side view of the multifiber optical connector plug of FIG. 12.
Figure 14:
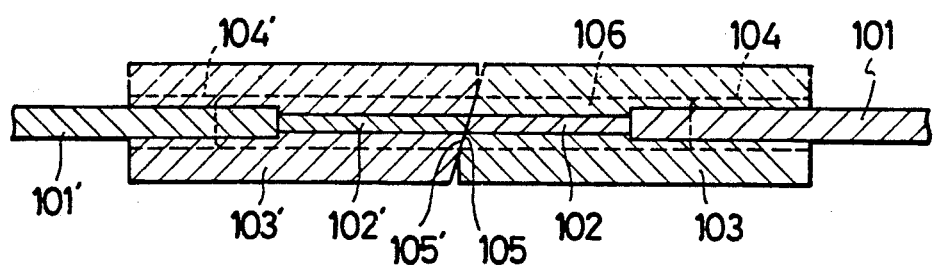
FIG. 14 is a cross sectional side view of a pair of the multifiber optical connector plugs of a type shown in FIG. 12 in a connected state.

Referring now to FIG. 12 to FIG. 14, a first embodiment of a multifiber optical connector plug according to the present invention will be described in detail.

In this first embodiment, the multifiber optical connector plug comprises a connector plug member 103 which houses a plurality of transversely arranged optical fibers 102 projecting out of the end of an optical fiber ribbon 101 and has a pair of guide pin insertion holes 104 with the transversely arranged optical fibers 102 located therebetween, while a connecting facet 105 of the connector plug member 103 has an oblique surface which is inclined with respect to the optical axes of the optical fibers 102 by an angle $\theta$ which is larger than the total reflection critical angle of the light beam transmitted through the optical fibers 102.

In this configuration, the connector plug member 103 is formed by a plastic material.

In addition, as shown in FIG. 13, the optical fibers 102 have endfaces which are parallel to the oblique surface of the connecting facet 105 and are projecting out of the connecting facet 105 by a length $\Delta L$ which is substantially smaller than an outer diameter of each of the optical fibers 102.

The oblique surface of the connecting facet 105 is obtained by the application of an oblique polishing onto the plastic connector plug member 103, and the projections of the endfaces of the optical fibers 102 are obtained by the application of a buffing polishing at the last step of the oblique polishing process. Namely, the hardness of the plastic from which the connector plug member 103 is made is smaller than that of the quartz from which the optical fibers 102 are made, so that the plastic is polished by larger extent than the quartz as the buffing polishing is applied longer. In this embodiment, it is sufficient for the projections of the optical fibers 102 to have the length $\Delta L$ approximately equal to 1% of the outer diameter of the optical fibers 102.

As shown in FIG. 14, in connecting two multifiber optical cores, the connecting facet 105 of one connector plug member 103 is brought face to face with a connecting facet 105' of another connector plug member 103', with the alignment of the connector plug members 103 and 103' provided by guide pins 106 inserted into the guide pin insertion holes 104 and 104' of the connector plug members 103 and 103'. The connector plug members 103 and 103' are then pressed against each other in an axial direction by pressing means such as a spring (not shown) so as to maintain the connected state with a proper alignment.

Here, the connecting facets 105 and 105' of the connector plug members 103 and 103' have the microscopic angular errors produced in the oblique polishing process. However, in the connected state shown in FIG. 14, these microscopic angular errors are cancelled out by the projections of the optical fibers 102 and 102' which enable the direct contact between the endfaces of the optical fibers 102 and 102', and by the elastic deformation of the plastic connector plug members 103 and 103' due to the pressing in the axial direction, so that there is no clearance between the connecting facets 105 and 105' when the connector plug members 103 and 103' are connected together.

It is noted that, in this embodiment, the undesirable damaging of the endfaces of the optical fibers 102 and 102' at a time of making the direct contact between the projected portions of the optical fibers 102 and 102' is effectively prevented by the following factors. Firstly, the size ΔL of the projection of each of the optical fibers 102 and 102' is substantially smaller than the outer diameter of each of the optical fibers 102 and 102'. Secondly, the connector plug members 103 and 103' make contact with each other not just in a vicinity of the optical fibers 102 and 102' but by the entire connecting facets 105 and 105' including regions surrounding the guide pin insertion holes 104 and 104', with the alignment provided by the commonly provided guide pins 106 inserted into the guide pin insertion holes 104 and 104', so that the relative rotation or displacement of the connector plug members 103 and 103' with respect to each other can be prevented, and therefore the endfaces of the optical fibers 102 and 102' can make direct contact with each other in the properly aligned state. Thirdly, the impact at a time of connection can be absorbed by the elastic deformation of the connector plug members 103 and 103' which are made of plastic material.

Accordingly, in this embodiment, the Fresnel reflection of the light beams transmitted through the optical fibers due to a presence of a clearance between the connecting facets is eliminated. In addition, because of the contact at oblique surfaces inclined at the angle θ which is larger than the total reflection critical angle of the light beams, the reflection due to a presence of a high refractive index layer formed on the endface of each of the optical fibers is the reflections at the oblique surfaces inclined at the angle θ, so that the reflected beams are not transmitted toward the light source. Consequently, it is possible to prevent the deterioration of the emission characteristic of the light source due to the light beams reflected toward the light source, as well as the increase of the connection loss due to the presence of the Fresnel reflection, without using any refractive index matching material to fill in the clearance.

Thus, according to this first embodiment, it becomes possible to provide a multifiber optical connector plug capable of realizing a stable connection characteristic of low reflection and low insertion loss, without using the refractive index matching material.

Figure 15:
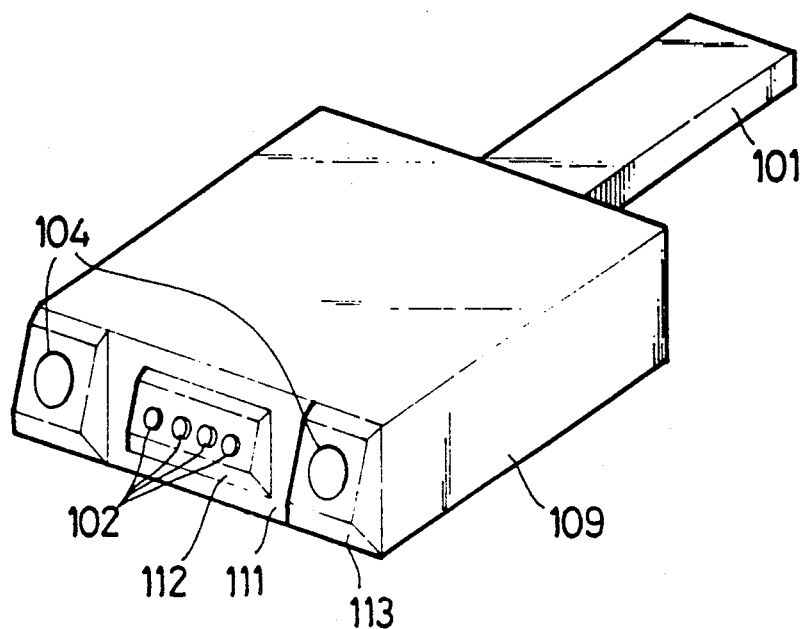
FIG. 15 is a perspective view of a second embodiment of a multifiber optical connector plug according to the present invention.
Figure 16:
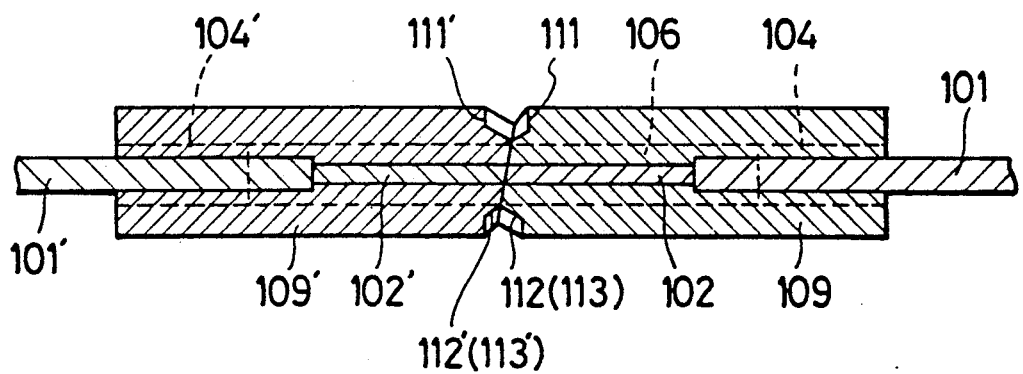
FIG. 16 is a cross sectional side view of a pair of the multifiber optical connector plugs of a type shown in FIG. 15 in a connected state.

Referring now to FIG. 15 to FIG. 16, a second embodiment of a multifiber optical connector plug according to the present invention will be described in detail.

In this second embodiment, the multifiber optical connector plug comprises a connector plug member 109 which houses a plurality of transversely arranged optical fibers 102 projecting out of the end of an optical fiber ribbon 101 and has a pair of guide pin insertion holes 104 with the transversely arranged optical fibers 102 located therebetween, just as in the first embodiment described above.

On the other hand, this configuration of FIG. 15 differs from that of FIG. 12 in that a connecting facet 111 of the connector plug member 109 has a central protruded portion 112 provided at a region surrounding the transversely arranged optical fibers 102 and peripheral protruded portion 113 provided at regions surrounding the guide pin insertion holes 104, where each of the central protruded portion 112 and the peripheral protruded portions 113 has an oblique surface which is inclined with respect to the optical axes of the optical fibers 102 by an angle θ which is larger than the total reflection critical angle of the light beam transmitted through the optical fibers 102.

In this configuration, the connector plug member 109 is formed by a plastic material, and as shown in FIG. 15, the optical fibers 102 have endfaces which are parallel to the oblique surface of the connecting facet 111 and are projecting out of the connecting facet 111 by a length ΔL which is substantially smaller than an outer diameter of each of the optical fibers 102, just as in the first embodiment described above.

The oblique surface of the central and peripheral protruded portions 112 and 113 provided on the connecting facet 111 is obtained by the application of an oblique polishing onto the plastic connector plug member 103, and the projections of the endfaces of the optical fibers 102 are obtained by the application of a buffing polishing at the last step of the oblique polishing process, just as in the first embodiment described above. In this embodiment, it is also sufficient for the projections of the optical fibers 102 to have the length ΔL approximately equal to 1% of the outer diameter of the optical fibers 102.

In this second embodiment, because of the incorporation of the central and peripheral protruded portions 112 and 113, the plastic molding of the connector plug member 109 is more complicated and time consuming compared with the first embodiment described above.

On the other hand, as shown in FIG. 16, when two connector plug members 109 and 109' are connected together, because the surface of the central protruded portion 112 which make contact with the surface of the central protruded portion 112 has an area smaller than that of the entire connecting facet 111, the angular errors produced in the oblique polishing process can be made substantially smaller compared with the configuration of FIG. 12 described above, and therefore this second embodiment has the advantage that the direct contact between the optical fibers 102 and 102' can be realized more easily.

Thus, according to this second embodiment, it also becomes possible to provide a multifiber optical connector plug capable of realizing a stable connection characteristic of low reflection and low insertion loss, without using the refractive index matching material.

Referring now to FIG. 17 to FIG. 21, a third embodiment of a multifiber optical connector plug according to the present invention will be described in detail.

In this third embodiment, the multifiber optical connector plug comprises a connector plug member 116 which houses a plurality of transversely arranged optical fibers 102 projecting out of the end of an optical fiber ribbon 101 and has a pair of guide pin insertion holes 104 with the transversely arranged optical fibers 102 located therebetween, while a connecting facet 117 of the connector plug member 116 has an oblique convex ellipsoidal surface which is inclined with respect to the optical axes of the optical fibers 102 by an angle $\theta$ which is larger than the total reflection critical angle of the light beam transmitted through the optical fibers 102.

In this configuration, the connector plug member 116 should be formed from an elastic material having the Young's modulus not greater than 30 GPa.

Figure 18:
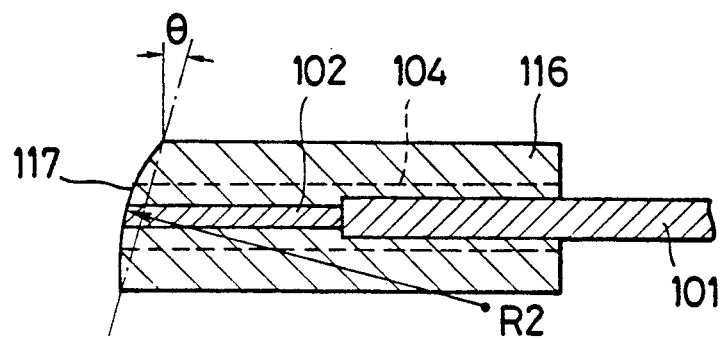
FIG. 18 is a cross sectional side view of the multifiber optical connector plug of FIG. 17.
Figure 19:
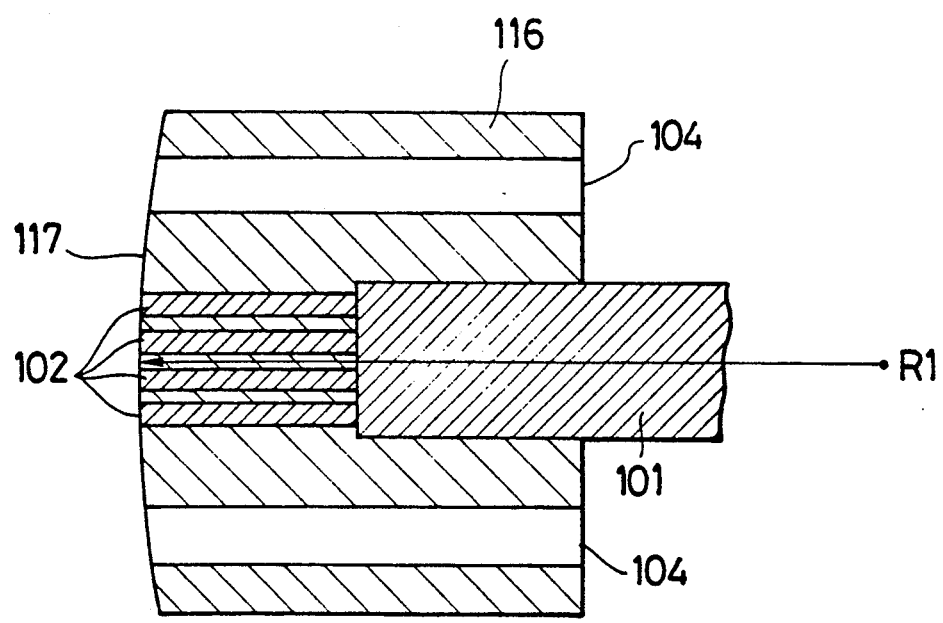
FIG. 19 is a cross sectional plan view of the multifiber optical connector plug of FIG. 17.

As shown in FIG. 18 and FIG. 19, the oblique convex ellipsoidal surface of the connecting facet 117 has a transverse radius of curvature R1 ($0 < R1 > \infty$) in the transverse direction at a center of the connecting facet 117, and a longitudinal radius of curvature R2 ($0 > R2 > \infty$) in a direction perpendicular to the transverse direction at the center of the connecting facet 117, and in this embodiment, the transverse radius of curvature R1 is made to be the largest radius of curvature and the longitudinal radius of curvature R2 is made to be the smallest radius of curvature, so that $R1 > R2$.

The oblique convex ellipsoidal surface of the connecting facet 117 is obtained by the successive application of an oblique polishing onto the connector plug member 116 to obtain an oblique surface inclined with respect to the optical axes of the optical fibers 102 by the angle $\theta$ and the buffing polishing onto this oblique surface to obtain the desired convex ellipsoidal surface. Namely, when the buffing polishing is applied to a rectangular end surface of the connector plug member mounted on a plastic sheet polishing disk for rotating the connector plug member, with the polishing pressure applied in the axial direction of the connector plug member, and by using the free abrasive grains, because the peripheral region of the rectangular end surface receives the polishing pressure larger than that received by the central region of the rectangular end surface, the peripheral region of the rectangular end surface is polished by larger extent compared with the central region, such that the rectangular end surface is polished into the desired convex ellipsoidal shape with the largest radius of curvature R1 along the longer side of the rectangular end surface and the smallest radius of curvature R2 along the shorter side of the rectangular end surface.

In this process of forming the oblique convex ellipsoidal surface of the connecting facet 117, the transverse radius of curvature R1 and the longitudinal radius of curvature R2 can be appropriately set by appropriately selecting the size of the rectangular end surface of the connector plug member before the application of the buffing polishing and the conditions of the buffing polishing such as the polishing pressure, polishing speed, materials of the polishing disk and abrasive grains, polishing time, etc.

Figure 20:
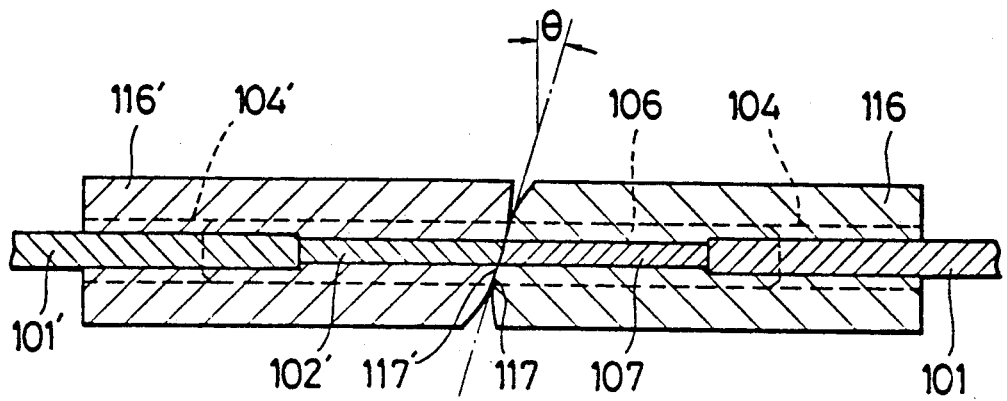
FIG. 20 is a cross sectional side view of a pair of the multifiber optical connector plugs of a type shown in FIG. 17 in a connected state.
Figure 21:
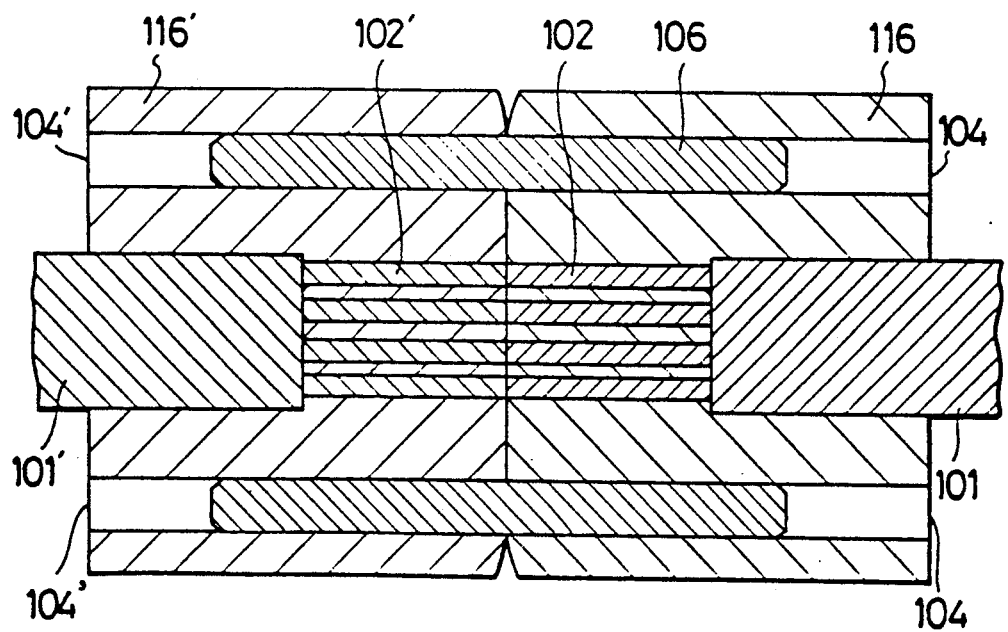
FIG. 21 is a cross sectional plan view of a pair of the multifiber optical connector plugs of a type shown in FIG. 17 in a connected state.

As shown in FIG. 20 and FIG. 21, in connecting two multifiber optical cores, the connecting facet 117 of one connector plug member 116 is brought face to face with a connecting facet 117' of another connector plug member 116', with the alignment of the connector plug members 116 and 116' provided by guide pins 106 inserted into the guide pin insertion holes 104 and 104' of the connector plug members 116 and 116'. The connector plug members 116 and 116' are then pressed against each other in axial direction by pressing means such as a spring (not shown) so as to maintain the connected state with a proper alignment.

In this third embodiment, an elliptical contact region centered around the central axis of the connector plug member is formed on the oblique convex elliptical surfaces of the connecting facets 117 and 117' on a contact plane between the connecting facets 117 and 117' which is inclined with respect to the optical axes of the optical fibers 102 by the angle $\theta$. The size of this elliptical contact region can be calculated as follows.

Namely, assuming that the force exerted by the pressing means in the axial direction is F, the connecting surface 117 receives a normal force $Fn = F\cos\theta$ normal to the contact plane and a tangent force $Ft = F\sin\theta$ tangent to the contact plane. The tangent force Ft is a force to make the connecting facets 117 slipping off the connecting facet 117', which is to be balanced by the frictional force between the connecting facets 117 and 117'. For this reason, in approximation, the elliptical contact region can be considered as formed by the elastic deformation of the connector plug members 116 and 116' due to the normal force Fn. Therefore, according to the Hertz formula, the elliptical contact region formed by the contact of the convex ellipsoidal surfaces can be defined by a major axis C, a minor axis D, and an elastic deformation W in the axial direction given by the following equations.

$$C = 1.11\alpha[(Fn/E) \cdot R1 \cdot R2/(R1+R2)]^{\frac{1}{3}} \quad (1)$$

$$D = 1.11\beta[(Fn/E) \cdot R1 \cdot R2/(R1+R2)]^{\frac{1}{3}} \quad (2)$$

$$W = 0.308\lambda[(Fn^2/E^2) \cdot (R1+R2)/(R1 \cdot R2)]^{\frac{1}{3}} \quad (3)$$

where E is the Young's modulus of the material used for the connector plug members, $\alpha$, $\beta$, and $\lambda$ are parameters determined by a ratio R1/R2 such that when $R1/R2 = 1$ (a case of spherical surface), these parameters take values of $\alpha = \beta = 1$ and $\lambda = 2$, and when $R1/R2 = 10$, these parameters take values of $\alpha = 2.40$, $\beta = 0.530$, and $\lambda = 1.55$.

Thus, for example, when the material used for the connector plug members is a plastic material in a form of the silica filled epoxy (E = 15 GPa), the normal force Fn = 1 Kgf, the transverse radius of curvature R1 = 1000 mm, and the longitudinal axis R2 = 100 mm, it follows from the equations (1) to (3) that 2C = 2.1 mm, 2D = 0.46 mm, and W = $0.8 \times 10^{-3}$ mm. This implies that the elliptical contact region in this case has approximately 2 mm width in the transverse direction in which the optical fibers 102 are arranged, and approximately 0.5 mm in the direction perpendicular to the transverse direction. Therefore, when the interval between the adjacent ones of the optical fibers 102 is set to be 0.25 mm, the length in the transverse direction required for the eight optical fibers is approximately equal to 1.9 mm, so that the eight optical fibers can be contained within the elliptical contact region of this exemplary, i.e., it is possible to provide the direct contacts for eight optical fibers simultaneously in this exemplary case.

Here, it is to be noted that if the silicon or ceramic material is used for the connector plug members, because the Young's modulus of silicon or ceramic material is 170 to 370 GPa which is larger than that of the plastic material by one order of magnitude, so that the elliptical contact region obtainable would become smaller to such an extent that the major and minor axes C and D would become less than a half, and the elastic deformation W would become less than a fifth. For this reason, it is very difficult to provide the direct contact for more than one optical fibers if the silicon or ceramic material is used for the connector plug members. Accordingly, it is important to use the elastic material having the Young's modulus not greater than 30 GPa in this embodiment, in order to be able to provide the direct contacts for a plurality of optical fibers simultaneously.

Also, the connecting facets 117 and 117' of the connector plug members 116 and 116' have the microscopic angular errors produced in the oblique polishing process. However, in the connected state shown in FIG. 20 and FIG. 21, these microscopic angular errors are cancelled out by the elastic deformation of the plastic connector plug members 116 and 116' due to the pressing in the axial direction, so that there is no clearance between the connecting facets 117 and 117' when the connector plug members 116 and 116' are connected together.

In addition, because the optical fibers 102 are made from the material which is harder than the connector plug members 116, the endfaces of the optical fibers 102 would not be polished into concave shapes, so that the clearance between the optical fibers 102 and 102' due to such concave shaped endfaces is also eliminated.

Consequently, in this embodiment, the Fresnel reflection of the light beams transmitted through the optical fibers due to a presence of a clearance between the connecting facets is eliminated. In addition, because of the contact at oblique surfaces inclined at the angle $\theta$ which is larger than the total reflection critical angle of the light beams, the reflection due to a presence of a high refractive index layer formed on the endface of each of the optical fibers is the reflections at the oblique surfaces inclined at the angle $\theta$, so that the reflected beams are not transmitted toward the light source. Consequently, it is possible to prevent the deterioration of the emission characteristic of the light source due to the light beams reflected toward the light source, as well as the increase of the connection loss due to the presence of the Fresnel reflection, without using any refractive index matching material to fill in the clearance.

Thus, according to this third embodiment, it also becomes possible to provide a multifiber optical connector plug capable of realizing a stable connection characteristic of low reflection and low insertion loss, without using the refractive index matching material.

Figure 22:
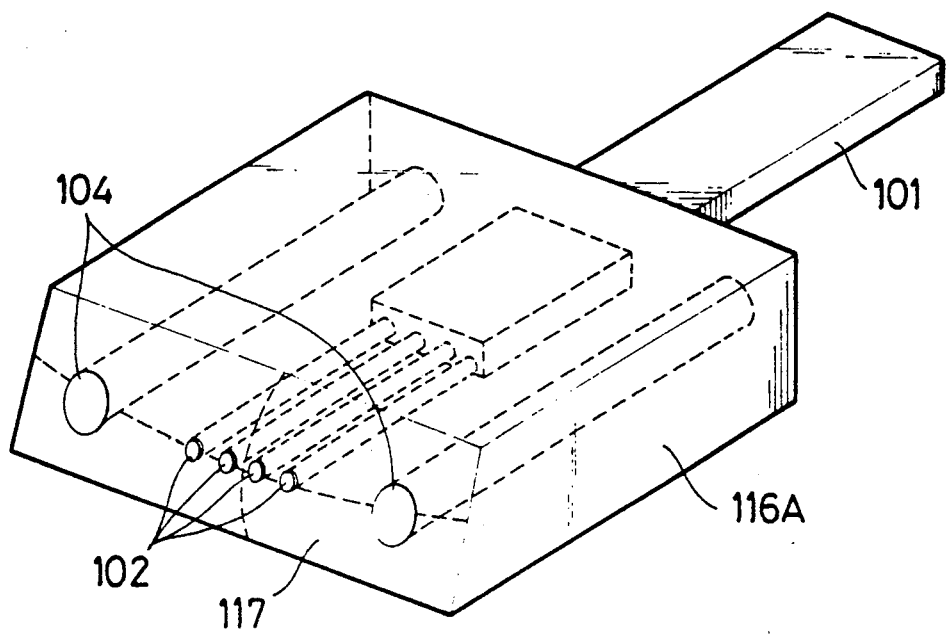
FIG. 22 is a perspective view of a fourth embodiment of a multifiber optical connector plug according to the present invention.
Figure 23:
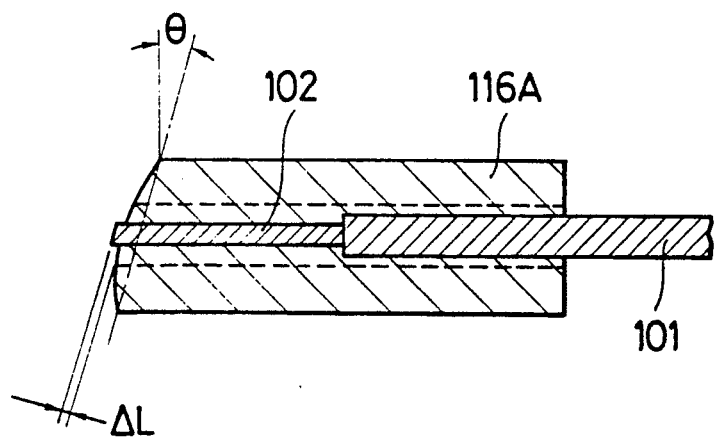
FIG. 23 is a cross sectional side view of the multifiber optical connector plug of FIG. 22.

Referring now to FIG. 22 and FIG. 23, a fourth embodiment of a multifiber optical connector plug according to the present invention will be described in detail.

This fourth embodiment is a modification of the third embodiment described above, which differs from the configuration of FIG. 17 in that, as clearly shown in FIG. 23, the connector plug member 116A is formed such that the optical fibers 102 have endfaces which are parallel to the oblique surface of the connecting facet 117 and are projecting out of the connecting facet 117 by a length $\Delta L$ which is substantially smaller than an outer diameter of each of the optical fibers 102, just as in the first embodiment described above.

The projections of the endfaces of the optical fibers 102 are obtained by the application of the buffing polishing at the last step of the polishing process, just as in the first embodiment described above. It is also sufficient for the projections of the optical fibers 102 to have the length $\Delta L$ approximately equal to 1% of the outer diameter of the optical fibers 102 in this embodiment.

By providing such projections of the endfaces of the optical fibers 102, it becomes possible in this fourth embodiment to secure the direct contacts of a plurality of the optical fibers 102 more easily.

Thus, according to this fourth embodiment, it also becomes possible to provide a multifiber optical connector plug capable of realizing a stable connection characteristic of low reflection and low insertion loss, without using the refractive index matching material.

Figure 24:
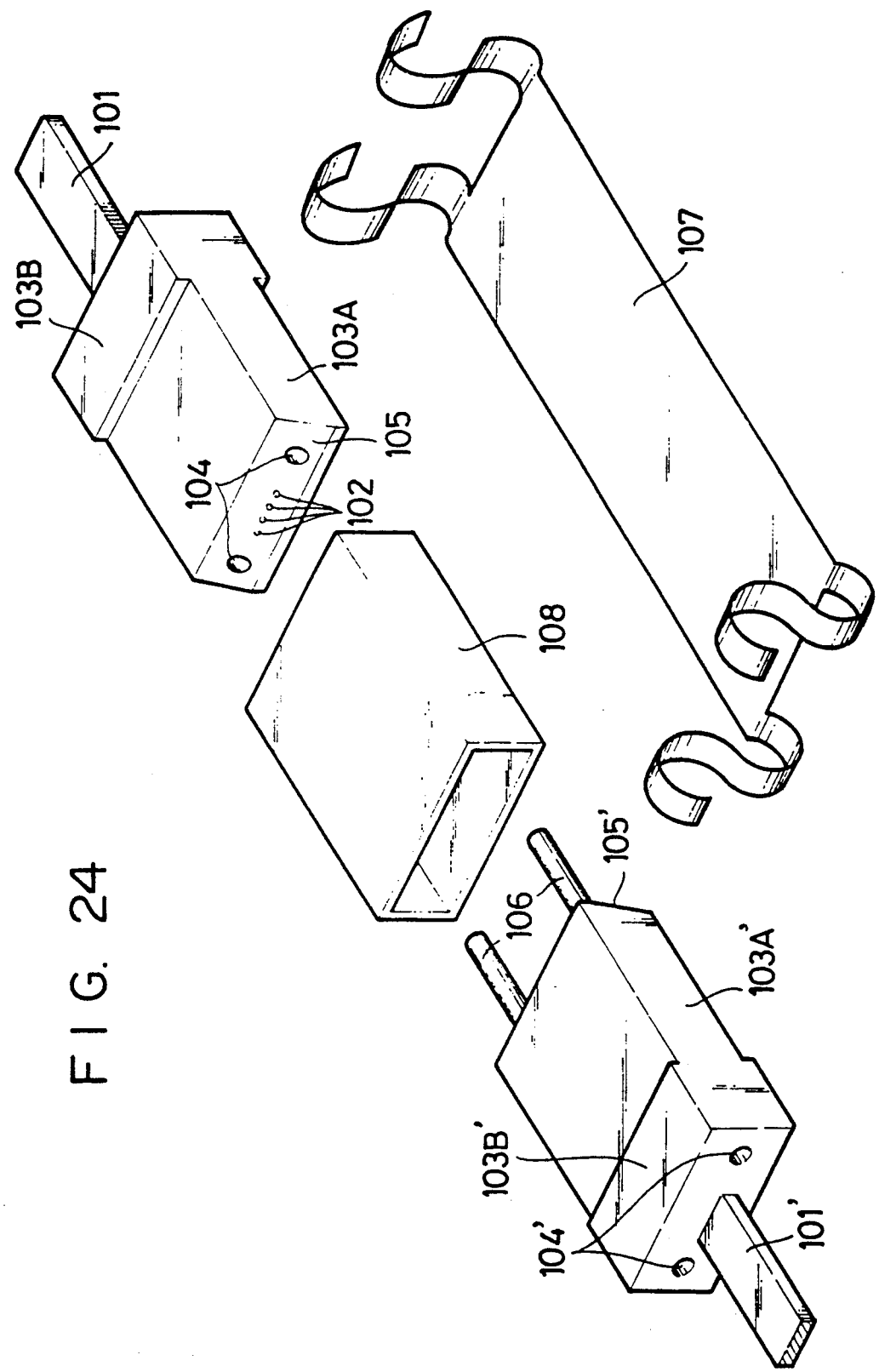
FIG. 24 is a perspective view of a first embodiment of a multifiber optical connector according to the present invention in a disconnected state.
Figure 25:
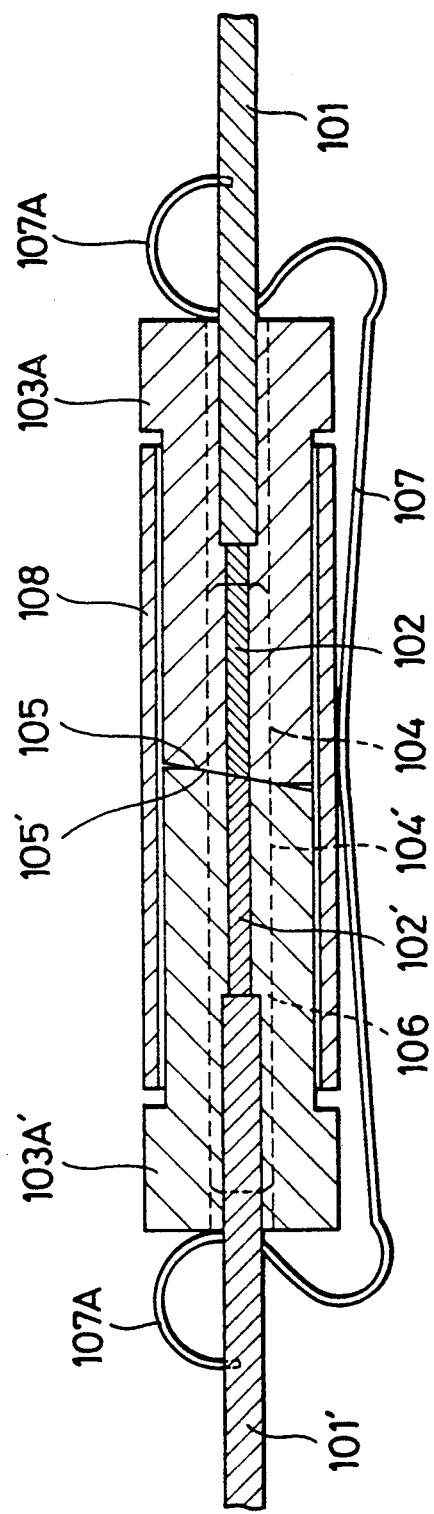
FIG. 25 is a cross sectional side view of the multifiber optical connector of FIG. 24 in a connected state.

Referring now to FIG. 24 and FIG. 25, a first embodiment of a multifiber optical connector according to the present invention will be described in detail.

In this embodiment of the multifiber optical connector, the connector plug members similar to those described above in conjunction with FIG. 12 to FIG. 14 are used.

Accordingly, the connector plug member 103A made of a plastic material houses a plurality of transversely arranged optical fibers 102 projecting out of the end of an optical fiber ribbon 101 and has a pair of guide pin insertion holes 104 with the transversely arranged optical fibers 102 located therebetween, while a connecting facet 105 of the connector plug member 103A has an oblique surface which is inclined with respect to the optical axes of the optical fibers 102 by an angle $\theta$ which is larger than the total reflection critical angle of the light beam transmitted through the optical fibers 102. Here, the optical fibers 102 have endfaces which are parallel to the oblique surface of the connecting facet 105 and are projecting out of the connecting facet 105 by a length $\Delta L$ which is substantially smaller than an outer diameter of each of the optical fibers 102.

In addition, the connector plug member 103A has a rear end portion 103B which is made to be larger than the connecting facet 105.

The connector plug member 103A' to be mated with the connector plug member 103A is similarly formed.

This multifiber optical connector further includes a clamp spring member 107 for clamping the connector plug members 103A and 103A' together when they are connected together, and a guide sleeve 108 inside of which the connector plug members 103A and 103A' are to be connected together. The guide sleeve 108 has an inner opening size which is slightly larger than the size of the connecting facet 105 but smaller than the size of the rear end portion 103B of the connector plug member 103A, such that the connector plug member 103A can be inserted into the guide sleeve 108 until the rear end portion 103B is abutted to the edge of the guide sleeve 108.

As shown in FIG. 25, in connecting two multifiber optical cores, the connector plug member 103A is inserted into one opening of the guide sleeve 108 while the connector plug member 103A' with the guide pins 106 inserted into the guide pin insertion holes 104' in advance is inserted into another opening of the guide sleeve 108, and the connecting facet 105 of the connector plug member 103A is brought face to face with a connecting facet 105' of the connector plug member 103A' inside the guide sleeve 108, such that the guide pins 106 can also be inserted into the guide pin insertion holes 104 of the connector plug member 103A inside the guide sleeve 108. Thus, the alignment of the connector plug members 103 and 103' is provided by the guide pins 106 as well as the guide sleeve 108. The connector plug members 103A and 103a' are then pressed against each other in an axial direction by attaching the clamp spring member 107 such that hook sections 107A of the clamp spring member 107 are hooked on rear sides of the connector plug members 103A and 103A', so as to maintain the connected state with a proper alignment.

This configuration of the multifiber optical connector has the advantage that the alignment of the connector plug members 103A and 103A' are provided by the commonly provided guide pins 106 inserted into the guide pin insertion holes 104 and 104' as well as by the guide sleeve 108 inside of which the connector plug members 103A and 103A' are connected together, so that the relative rotation or displacement of the connector plug members 103A and 103A' with respect to each other can be prevented more accurately, and therefore the endfaces of the optical fibers 102 and 102' can make direct contact with each other in the properly aligned state more accurately.

It should be obvious here that all the advantages of the connector plug configuration shown in FIG. 12 to FIG. 14 can be retained in this multifiber optical connector as well.

Thus, according to this first embodiment, it becomes possible to provide a multifiber optical connector capable of realizing a stable connection characteristic of low reflection and low insertion loss, without using the refractive index matching material.

In addition, according to this first embodiment, it becomes possible to provide a multifiber optical connector capable of realizing an improved maneuverability in the connection and reconnection operations.

Figure 26:
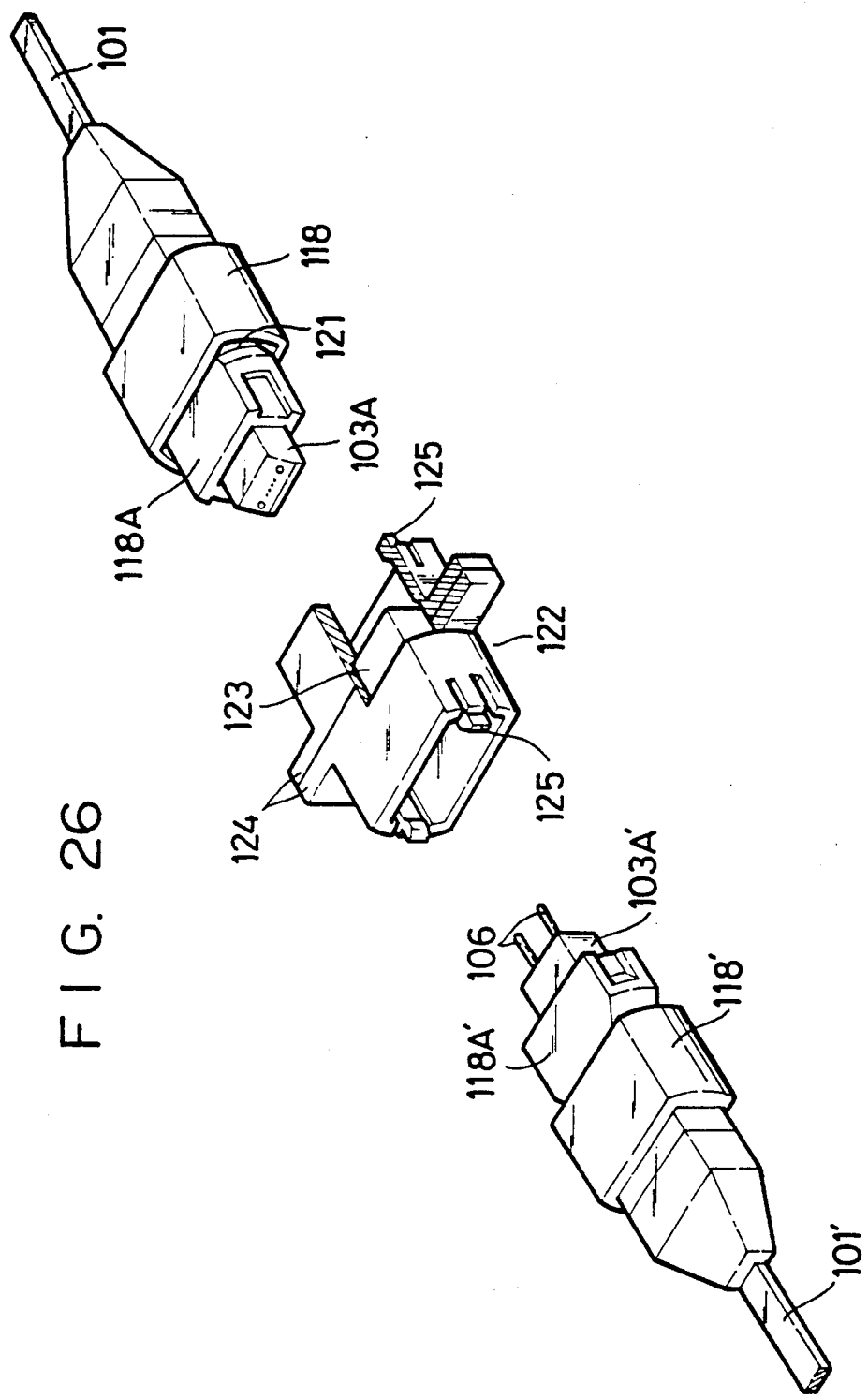
FIG. 26 is a perspective view of a second embodiment of a multifiber optical connector according to the present invention in a disconnected state.
Figure 27:
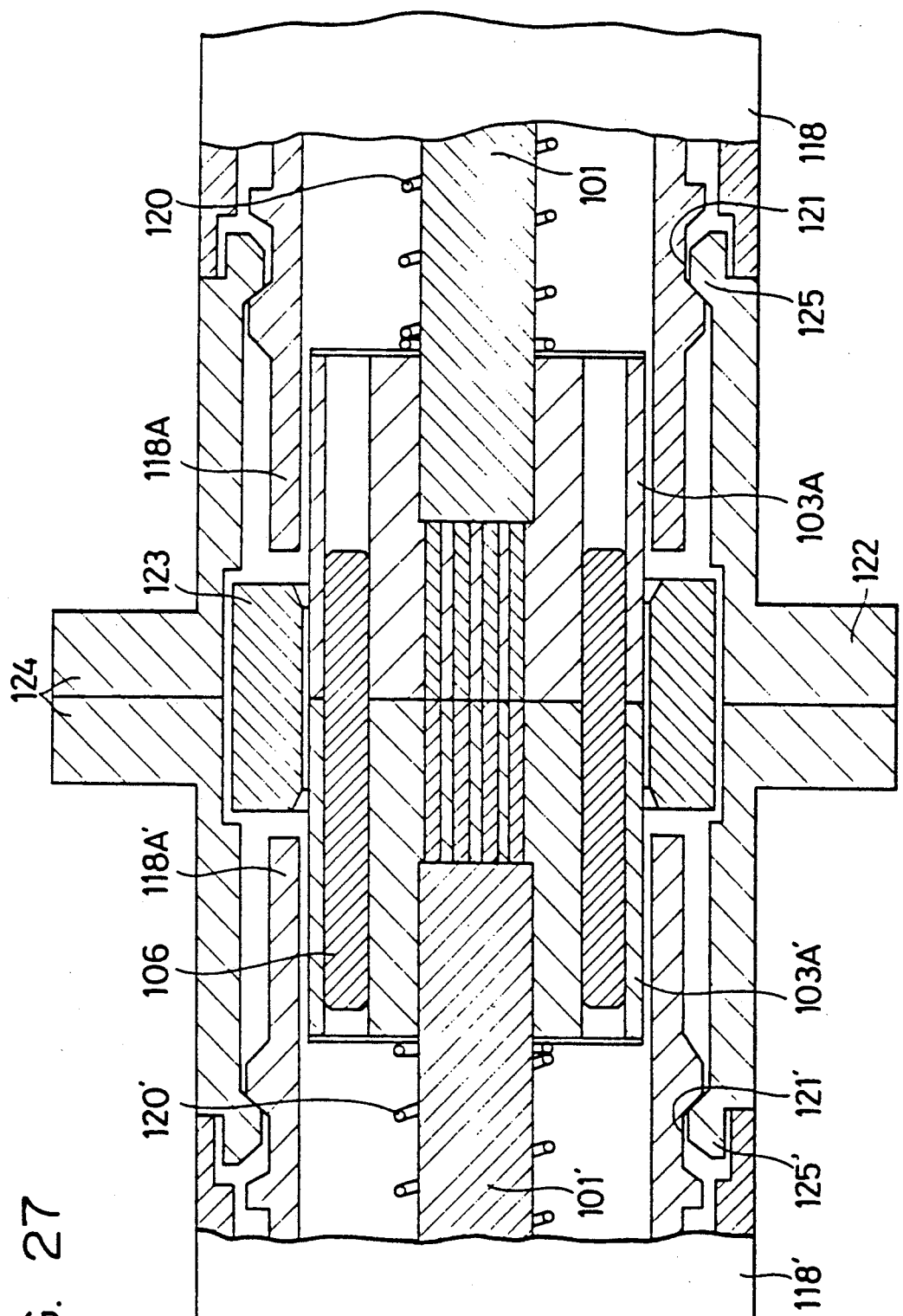
FIG. 27 is a cross sectional plan view of the multifiber optical connector of FIG. 26 in a connected state.
Figure 28:
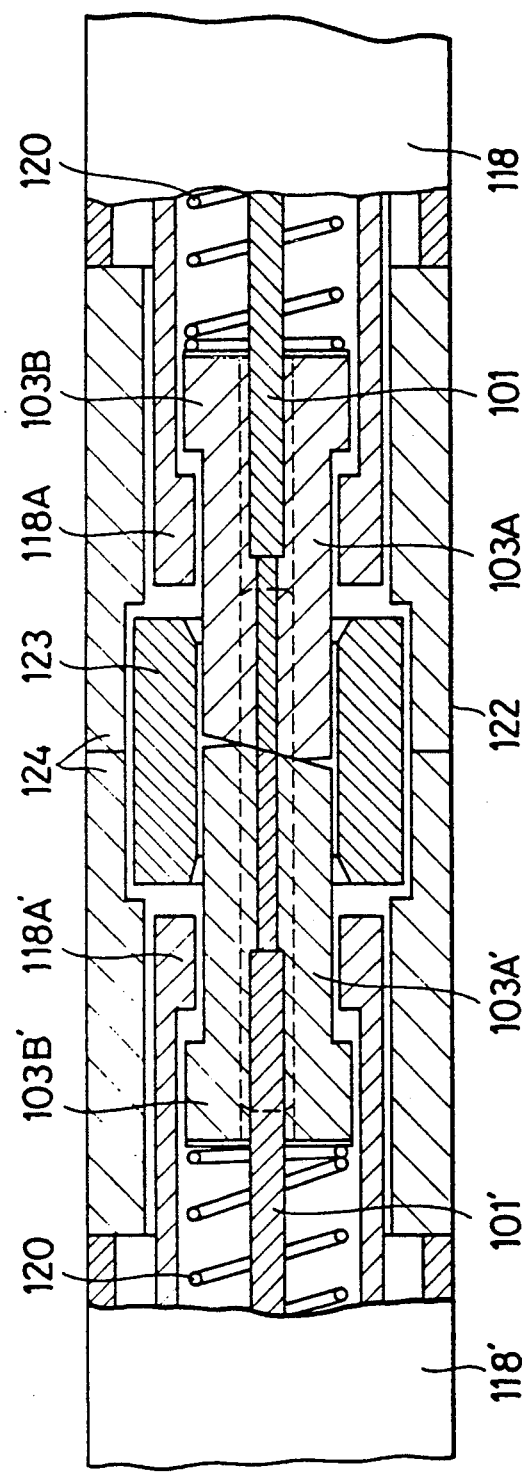
FIG. 28 is a cross sectional side view of the multifiber optical connector of FIG. 26 in a connected state.

Referring now to FIG. 26 to FIG. 28, a second embodiment of a multifiber optical connector according to the present invention will be described in detail.

In this embodiment of the multifiber optical connector, the connector plug members similar to those described above in conjunction with FIG. 12 to FIG. 14 are used as multifiber connector ferrules in the multifiber optical connector plug assemblies.

Accordingly, the multifiber connector ferrule 103A made of a plastic material houses a plurality of transversely arranged optical fibers 102 projecting out of the end of an optical fiber ribbon 101 and has a pair of guide pin insertion holes 104 with the transversely arranged optical fibers 102 located therebetween, while a connecting facet 105 of the multifiber connector ferrule 103A has an oblique surface which is inclined with respect to the optical axes of the optical fibers 102 by an angle θ which is larger than the total reflection critical angle of the light beam transmitted through the optical fibers 102. Here, the optical fibers 102 have endfaces which are parallel to the oblique surface of the connecting facet 105 and are projecting out of the connecting facet 105 by a length ΔL which is substantially smaller than an outer diameter of each of the optical fibers 102.

In addition, the multifiber connector ferrule 103A has a rear end portion 103B which is made to be larger than the connecting facet 105, and as shown in FIG. 27 and FIG. 28, the multifiber optical connector plug assembly is formed by casing the multifiber connector ferrule 103A inside a front end section 118A of the push-on type connector plug case 118, where the multifiber connector ferrule 103A is pushed in an axial direction toward the front side by a coil spring member 120 provided inside the connector plug case 118.

The multifiber connector ferrule 103A' to be mated with the multifiber connector ferrule 103A is similarly formed.

This multifiber optical connector further includes: a push-on type adaptor 122 having a guide sleeve 123 similar to the guide sleeve 108 of the first embodiment described above, inside of which the multifiber connector ferrules 103A and 103A' are connected together; an outer housing 124 which houses the guide sleeve 123 therein; and elastic engagement hook members 125 to be engaged with an engagement grooves 121 provided on the front end section 118A of the push-on type connector plug case 118.

The guide sleeve 123 has an inner opening size which is slightly larger than he size of the connecting facet 105 of the multifiber connector ferrule 103A but smaller than the front end section 118A of the connector plug case 118, such that the multifiber connector ferrule 103A can be inserted into the guide sleeve 123 until the edge of the front end section 118A is abutted to the edge of the guide sleeve 123. The guide sleeve 123 also has the tapered inner opening edges for the purpose of easy insertion of the multifiber connector ferrules 103A.

The outer housing 124 has an inner opening size which is larger than the outer size of the guide sleeve 123 in a vicinity of the guide sleeve 123, and which is smaller than the outer size of the guide sleeve 123 but larger than the inner opening size of the guide sleeve 123 in both sides of the guide sleeve 123, such that the guide sleeve 123 is housed inside the outer housing 124 in a floating state. This feature of the adaptor 122 enable the smooth insertion of the multifiber connector ferrule 103A into the guide sleeve 123.

As shown in FIG. 27 and FIG. 28, in connecting two multifiber optical cores, the front end section 118A of the connector plug case 118 is inserted into one opening of the adaptor 122 until the elastic engagement hook members 125 are engaged with the engagement grooves 121 while the front end section 118A of the connector plug case 118' is inserted into one opening of the adaptor 122 until the elastic engagement hook members 125' are engaged with the engagement grooves 121', such that the multifiber connector ferrule 103A is inserted into one opening of the guide sleeve 123 of the push-on type adaptor 122 while the multifiber connector ferrule 103A' with the guide pins 106 inserted into the guide pin insertion holes 104' in advance is inserted into another opening of the guide sleeve 123. As a result, the connecting facet 105 of the multifiber connector ferrule 103A is brought face to face with a connectint facet 105' of the multifiber connector ferrule 103A' inside the guide sleeve 123, such that the guide pins 106 can also be inserted into the guide pin insertion holes 104 of the multifiber connector ferrule 103A inside the guide sleeve 123. Thus, the alignment of the multifiber connector ferrules 103 and 103' is provided by the guide pins 106 as well as the guide sleeve 108. In this connected state, the multifiber connector ferrules 103A and 103A' are pressed against each other in an axial direction by the coil spring members 120 and 120', so as to maintain the connected state with a proper alignment.

Similarly to the first embodiment described above, this configuration of the multifiber optical connector has the advantage that the alignment of the multifiber connector ferrules 103A and 103A' are provided by the commonly provided guide pins 106 inserted into the guide pin insertion holes 104 and 104' as well as by the guide sleeve 108 inside of which the multifiber connector ferrules 103A and 103A' are connected together, so that the relative rotation or displacement of the multifiber connector ferrules 103A and 103A' with respect to each other can be prevented more accurately, and therefore the endfaces of the optical fibers 102 and 102' can make contact with each other in the properly aligned state more accurately.

In addition, this configuration of the multifiber optical connector has the additional advantage that a large impact applied to the multifiber optical connector such as the impact due to the dropping of the connector can effectively be absorbed by the elastic deformation of the coil spring members 120 and 120' and the floating motion of the guide sleeve 123 inside the outer housing 124 of the adaptor 122 in which the multifiber connector ferrules 103A and 103A' are connected together. Consequently, the undersirable angular displacement between the multifiber connector ferrules 103A and 103A' can be prevented more accurately, so that the connection loss of the multifiber optical connector can be stabilized significantly.

It should be obvious here that all the advantages of the connector plug configuration shown in FIG. 12 to FIG. 14 can be retained in this multifiber optical connector plug assembly as well.

Thus, according to this second embodiment, it becomes possible to provide a multifiber optical connector capable of realizing a stable connection characteristic of low reflection and low insertion loss, without using the refractive index matching material.

In addition, according to this second embodiment, it becomes possible to provide a multifiber optical connector capable of realizing an improved maneuverability in the attaching and detaching operations.

It is to be noted that in this second embodiment of the multifiber optical connector, the push-on type coupling structure employed in the connector plug case 118 and the adaptor 122 may be replaced by the other known coupling structure such as a screw coupling structure or a bayonet coupling structure.

Figure 29:
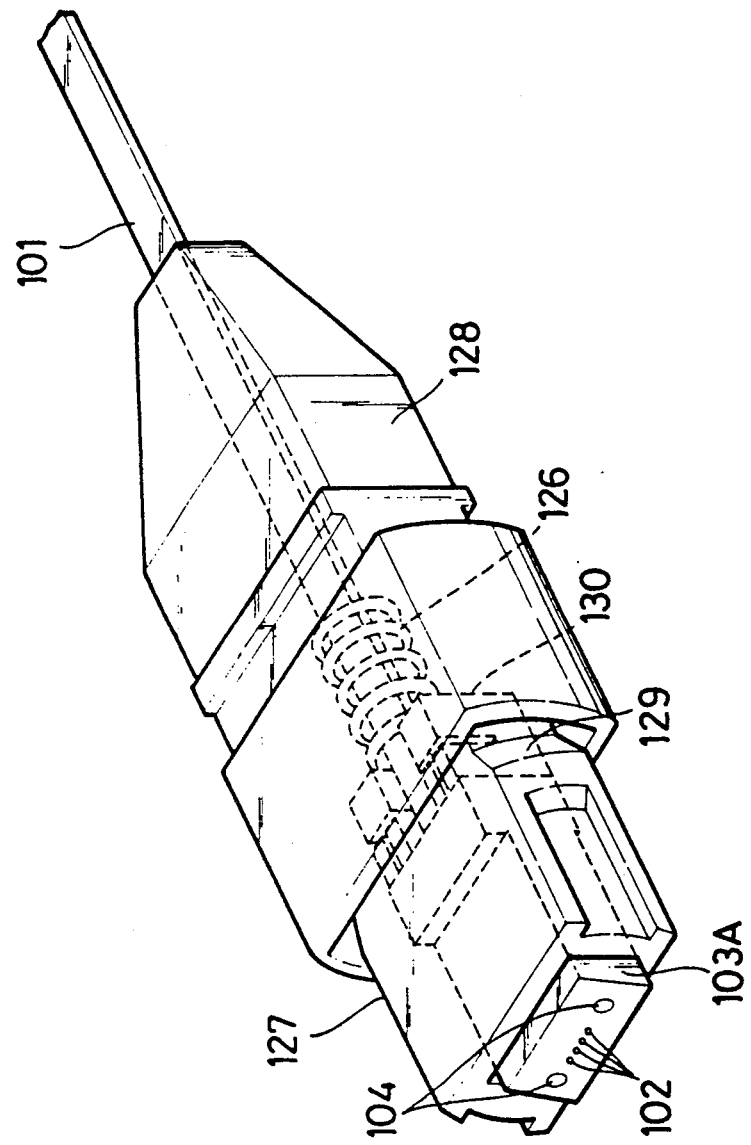
FIG. 29 is a perspective view of a multifiber optical connector plug assembly used in a third embodiment of a multifiber optical connector according to the present invention.
Figure 30:
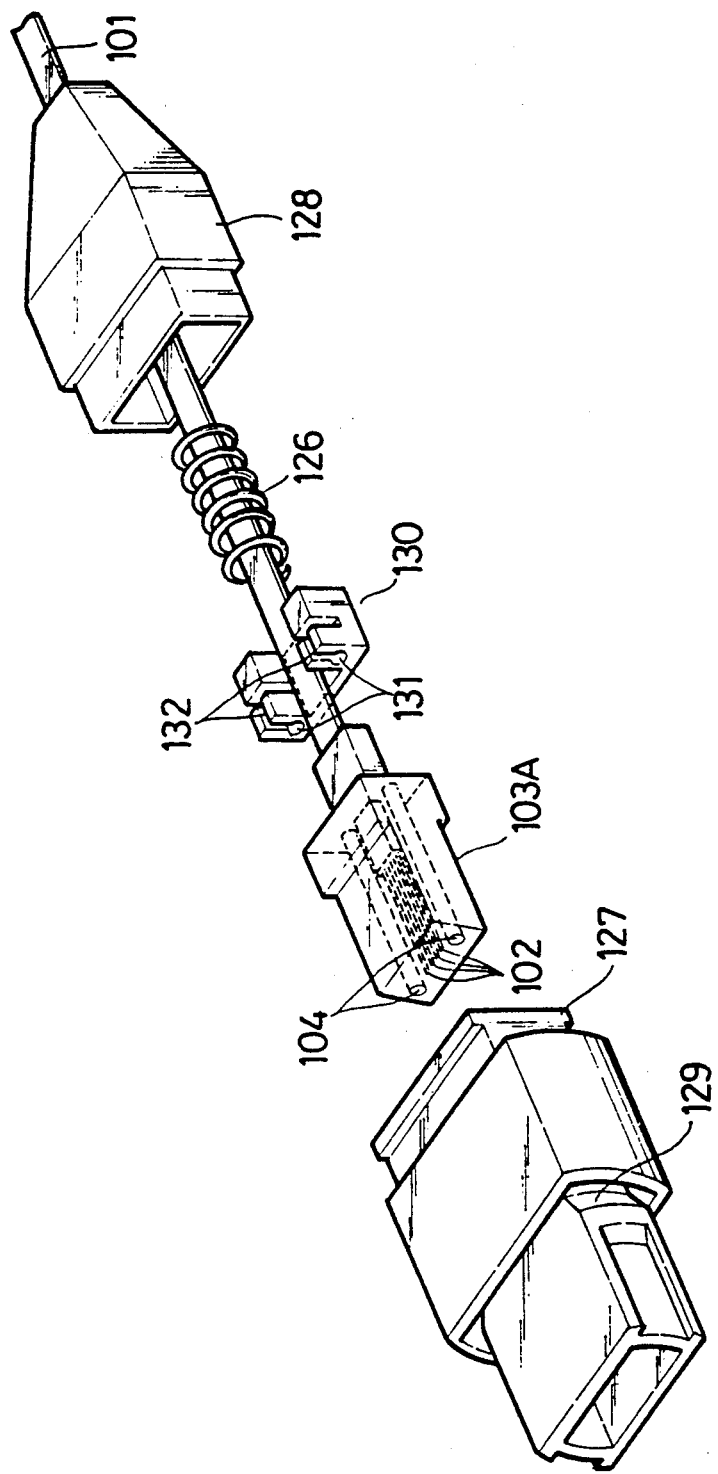
FIG. 30 is an expanded perspective view of the multifiber optical connector plug assembly of FIG. 29.

Referring now to FIG. 29 and FIG. 30, a third embodiment of a multifiber optical connector according to the present invention will be described in detail.

In this embodiment, the connector plug members similar to those described above in conjunction with FIG. 12 to FIG. 14 are used as multifiber connector ferrules in the multifiber optical connector plug assemblies.

Accordingly, the multifiber connector ferrule 103A formed by a plastic material houses a plurality of transversely arranged optical fibers 102 projecting out of the end of an optical fiber ribbon 101 and has a pair of guide pin insertion holes 104 with the transversely arranged optical fibers 102 located therebetween, while a connecting facet 105 of the multifiber connector ferrule 103A has an oblique surface which is inclined with respect to the optical axes of the optical fibers 102 by an angle $\theta$ which is larger than the total reflection critical angle of the light beam transmitted through the optical fibers 102. Here, the optical fibers 102 have endfaces which are parallel to the oblique surface of the connecting facet 105 and are projecting out of the connecting facet 105 by a length $\Delta L$ which is substantially smaller than an outer diameter of each of the optical fibers 102.

The multifiber connector ferrule to be mated with the multifiber connector ferrule 103A is similarly formed.

In this embodiment, the multifiber optical connector plug assembly further comprises: a guide pin holding member 130 provided behind the multifiber connector ferrule 103A for holding the guide pin inserted into the guide pin insertion holes 104 from extending behind the multifiber connector ferrule 103A; a spring member 126 provided behind the guide pin holding member 130 for pressing the multifiber connector ferrule 103A against a mated multifiber connector ferrule in an axial direction; and a front housing 127 and a rear housing 128 for integrally housing the multifiber connector ferrule 103A, the guide pin holding member 130, and the spring member 126 together.

Here, as shown in FIG. 30, the guide pin holding member 130 has guide pin holding holes 131 having inner diameters slightly smaller than those of the guide pins 106, and slits 132 for splitting the upper parts of the circumferences of of the guide pin holding holes 131, such that when the guide pins 106 are inserted into the guide pin insertion holes 104 and reached the guide pin holding member 130 located behind the multifiber connector ferrule 103A, the slits 132 are elastically deformed by the thrusting guide pins 106 to widen the guide pin holding holes 131 such that the tip ends of the guide pins 106 can be inserted into and held inside the guide pin holding holes 131.

Figure 1:
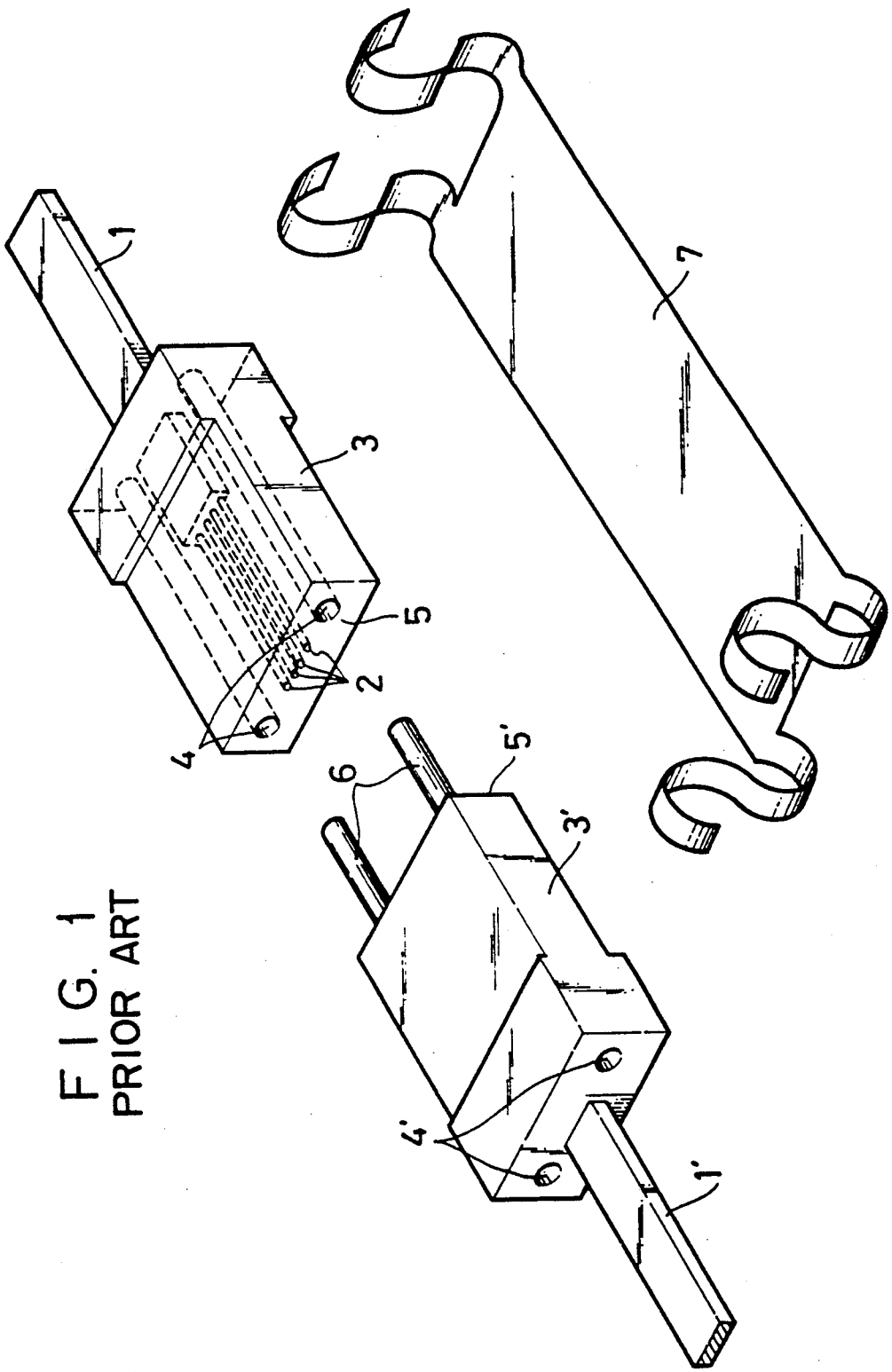
FIG. 1 is a perspective view of a first example of a conventional multifiber optical connector plug.
Figure 2:
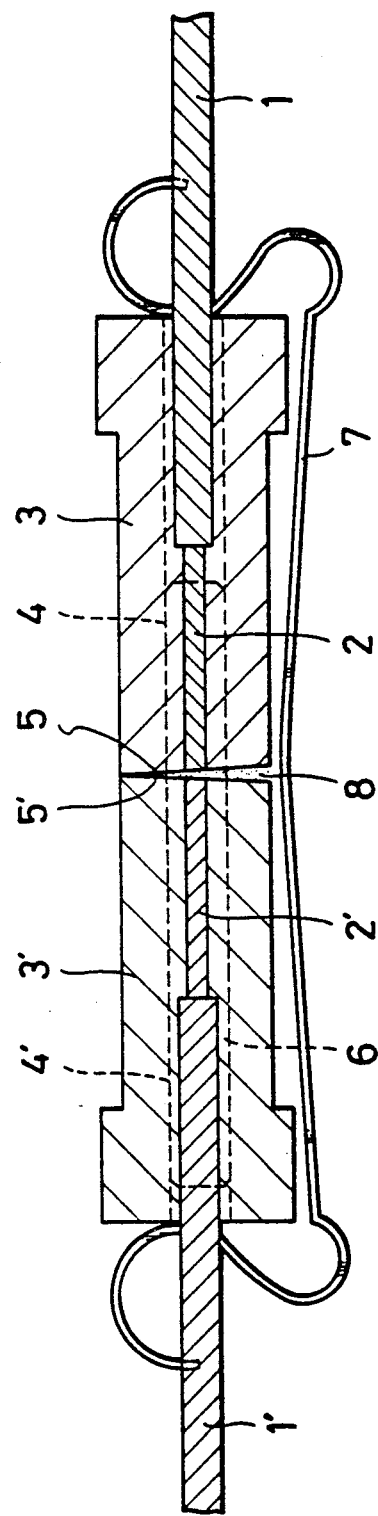
FIG. 2 is a cross sectional side view of a pair of the conventional multifiber optical connector plugs of a type shown in FIG. 1 in a connected state.
Figure 3:
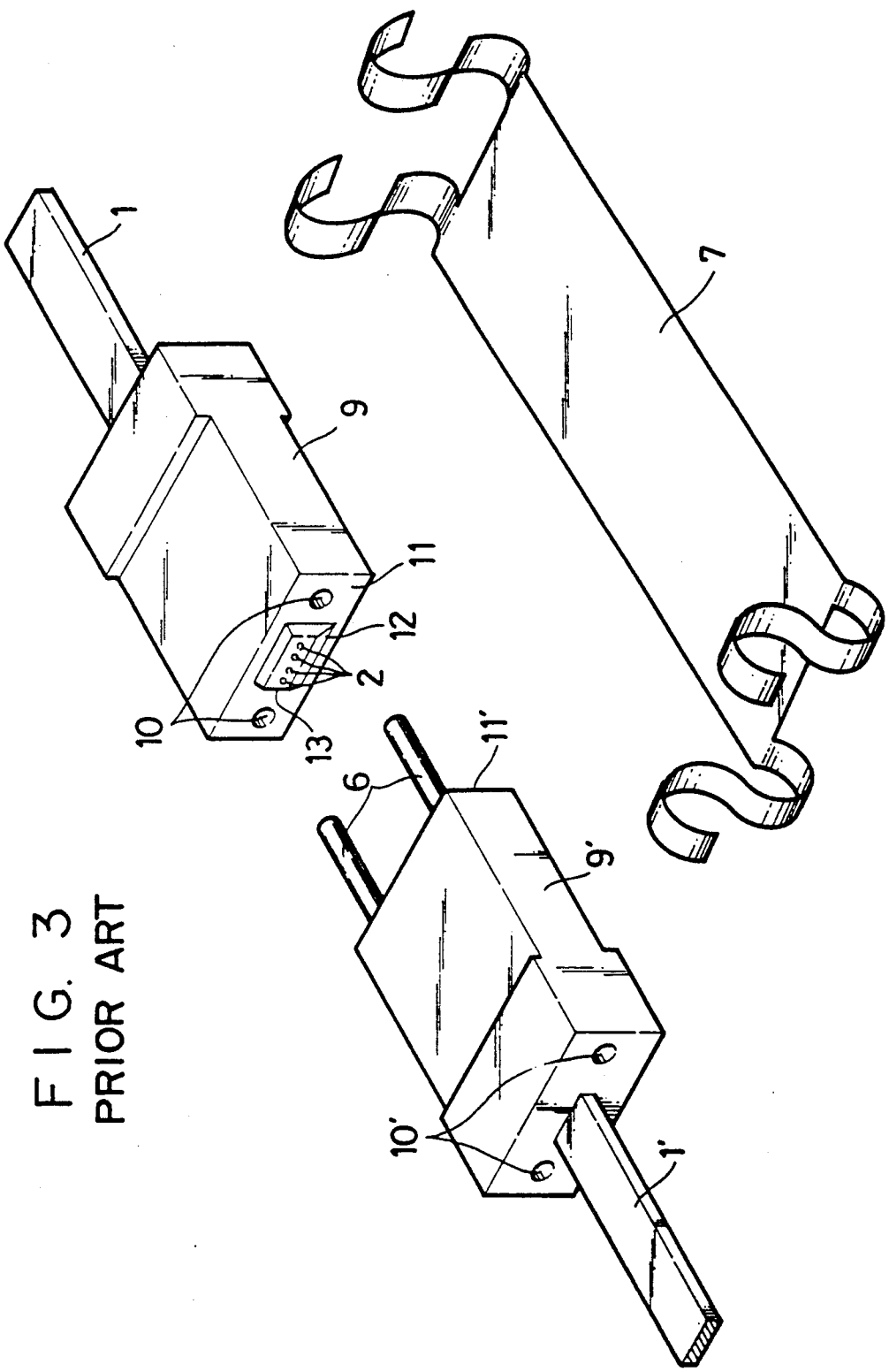
FIG. 3 is a perspective view of a second example of a conventional multifiber optical connector plug.
Figure 4:
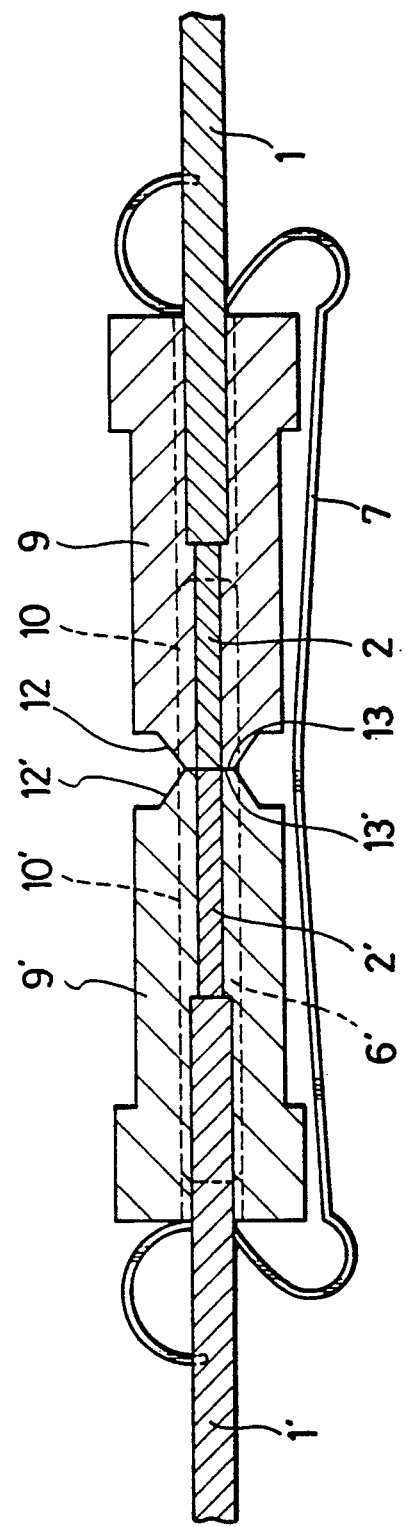
FIG. 4 is a cross sectional side view of a pair of the conventional multifiber optical connector plugs of a type shown in FIG. 3 in a connected state.
Figure 5:
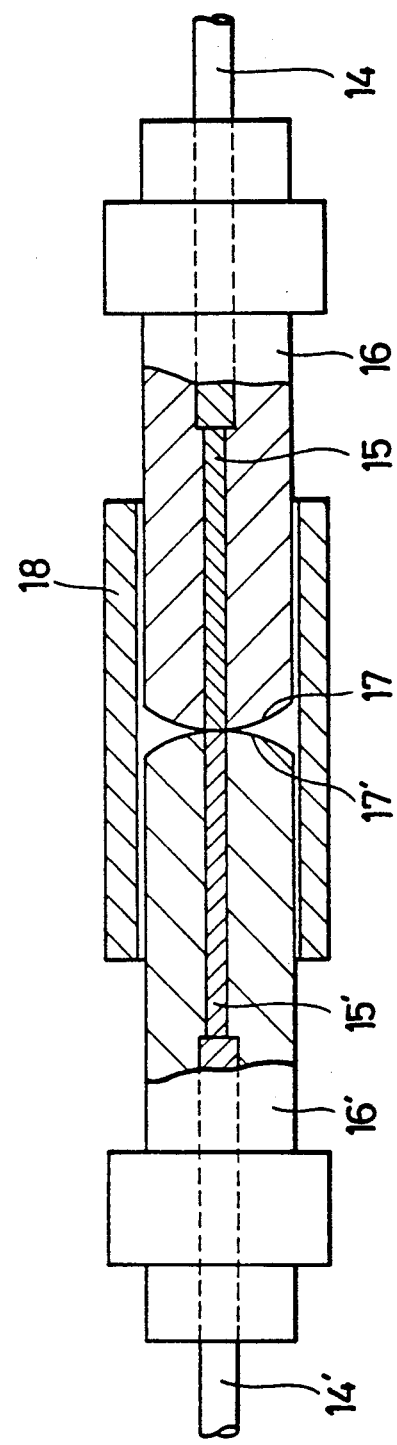
FIG. 5 is a cross sectional side view of a pair of first example of conventional single fiber optical connector plugs in a connected state.
Figure 6:
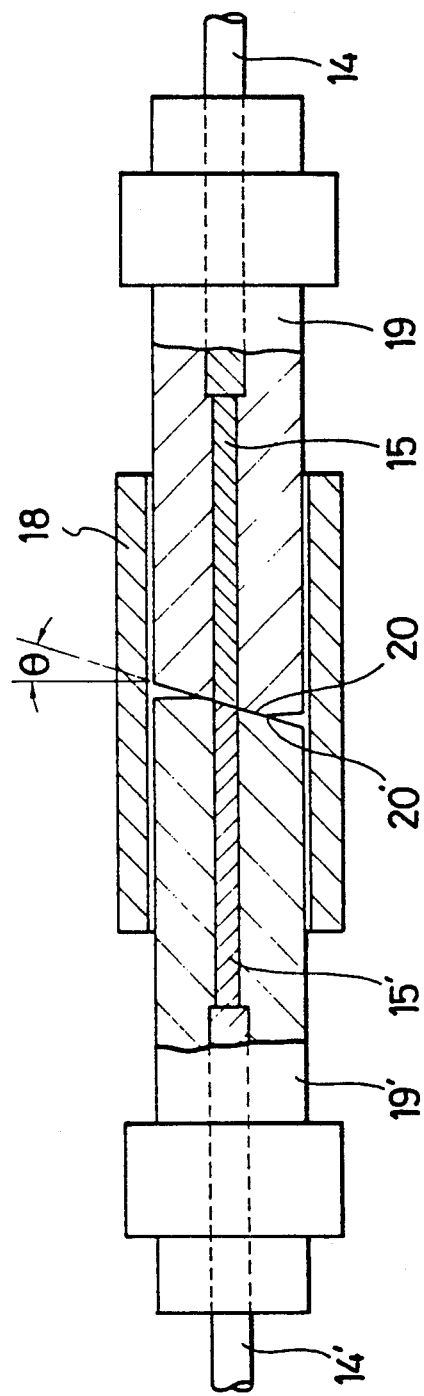
FIG. 6 is a cross sectional side view of a pair of second example of conventional single fiber optical connector plugs in a connected state.
Figure 7:
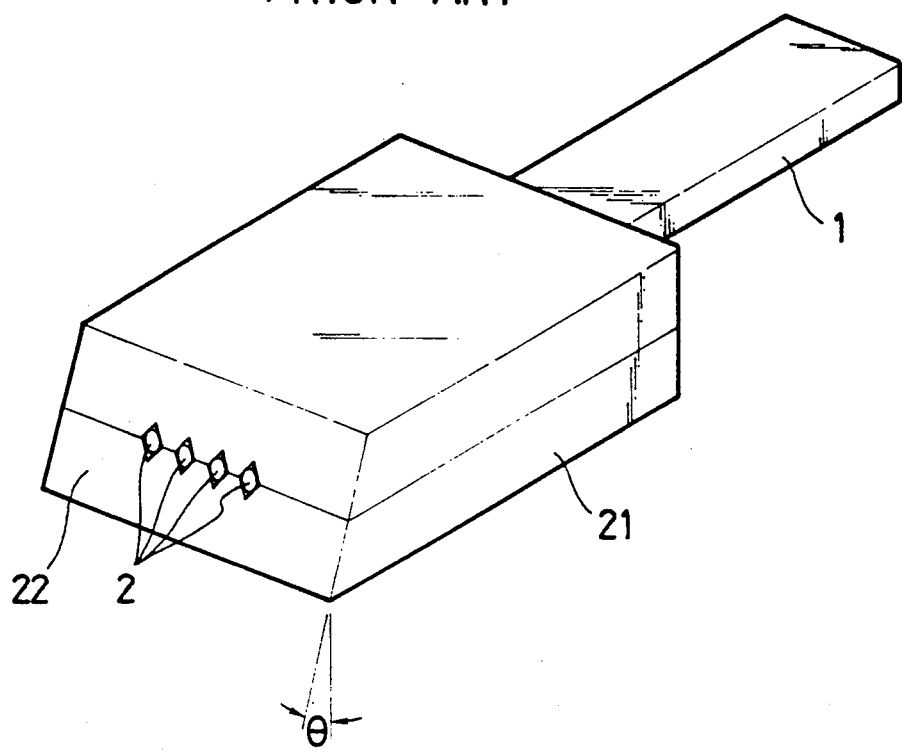
FIG. 7 is a perspective view of a third example of a conventional multifiber optical connector plug.
Figure 8:
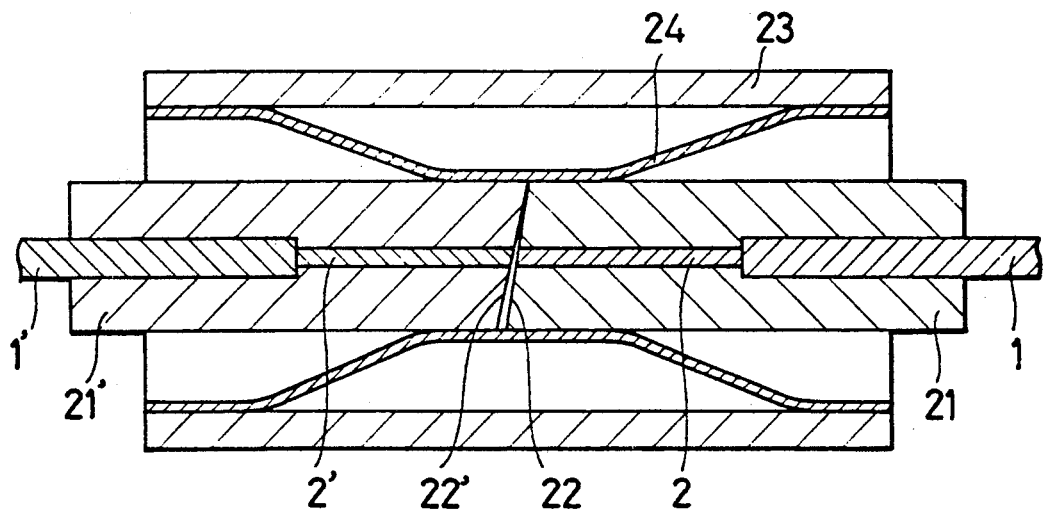
FIG. 8 is a cross sectional side view of a pair of the conventional multifiber optical connector plugs of a type shown in FIG. 7 in a connected state.
Figure 9:
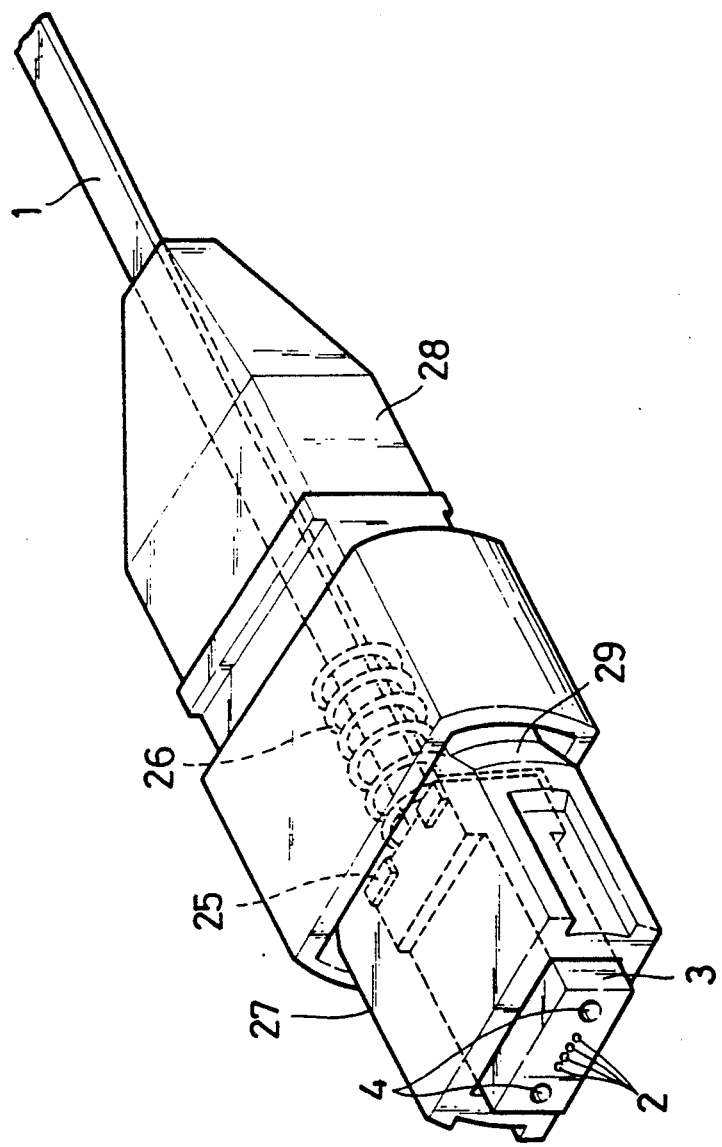
FIG. 9 is a perspective view of one example of a conventional multifiber optical connector plug assembly.
Figure 10:
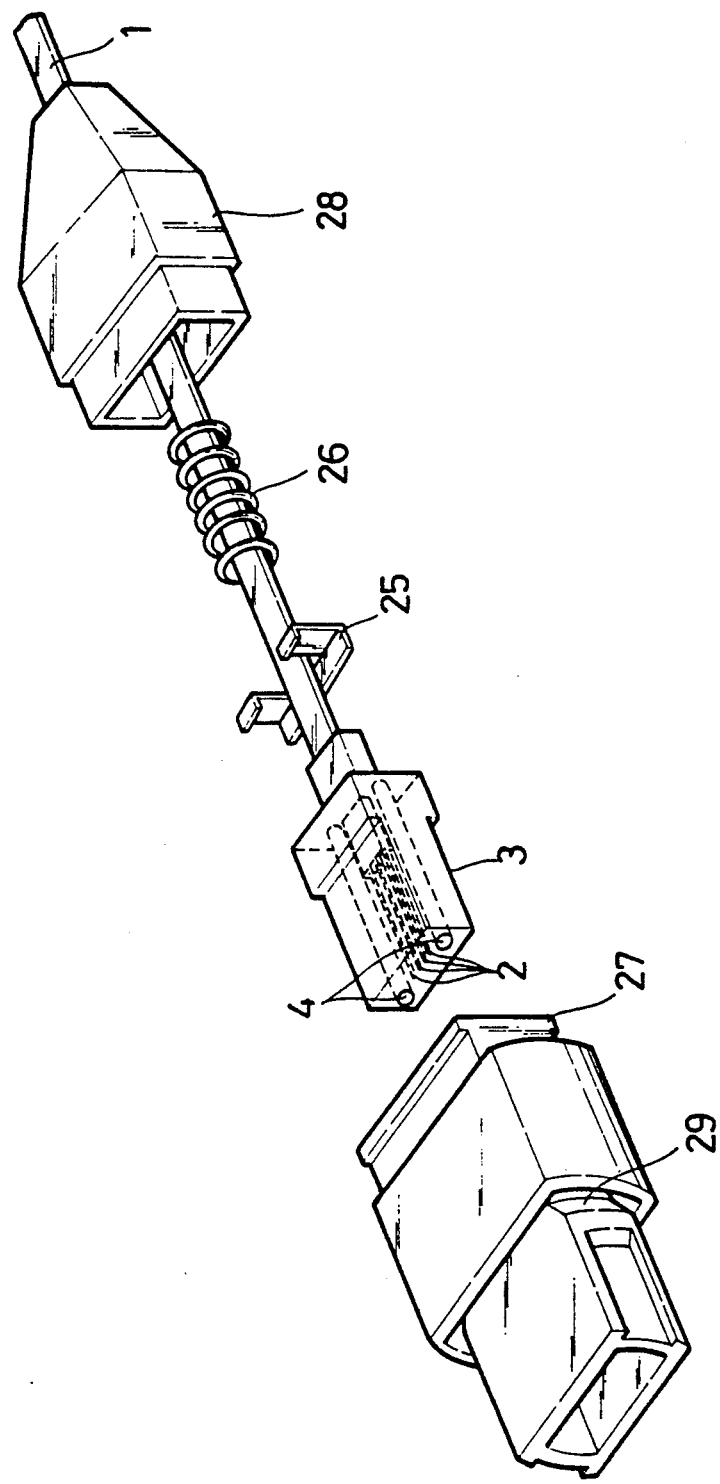
FIG. 10 is an expanded perspective view of the conventional multifiber optical connector plug assembly of FIG. 9.
Figure 11:
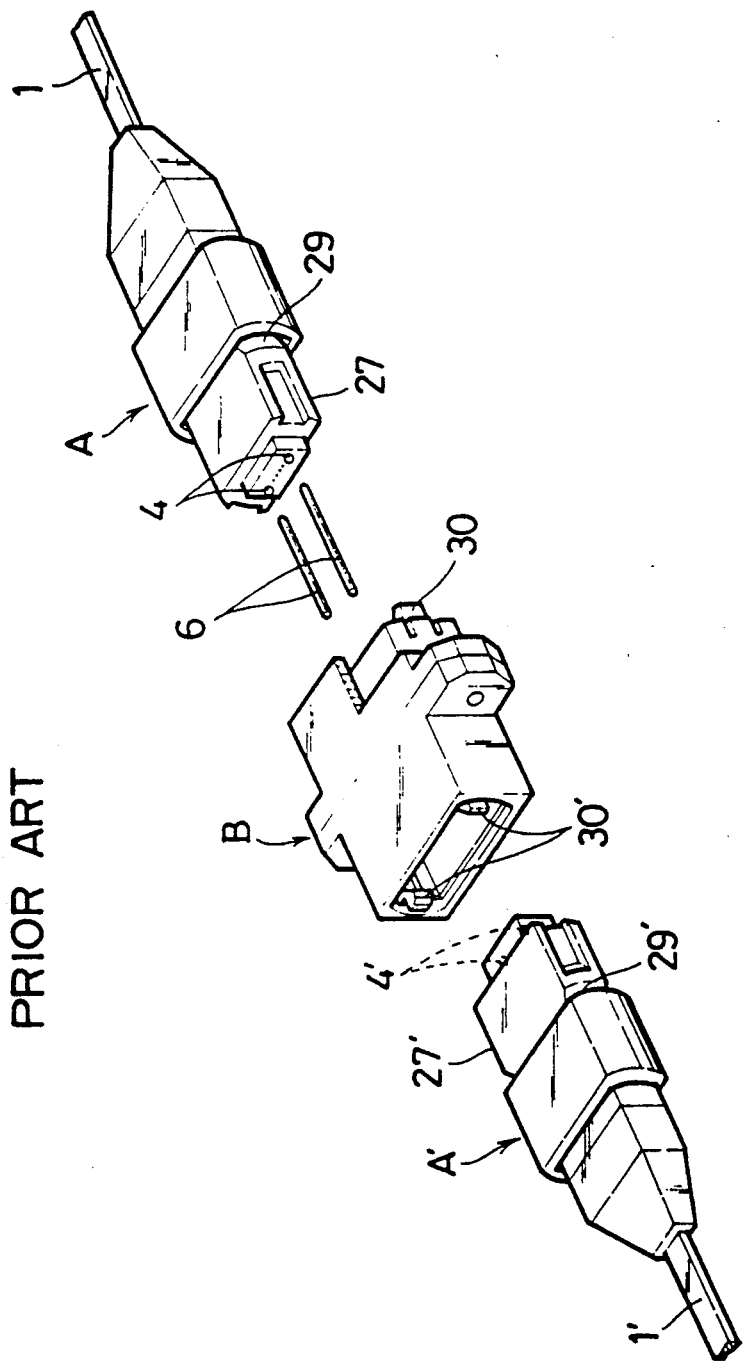
FIG. 11 is a perspective view of the conventional multifiber optical connector using conventional multifiber optical connector plug assemblies of a type shown in FIG. 9 in a disconnected state.

The multifiber optical connector of this embodiment also includes an adaptor similar to that shown in FIG. 11 described above, in which two multifiber optical connector plug assemblies of a type shown in FIG. 29 and FIG. 30 are attached together.

Thus, in connecting two multifiber optical connector plug assemblies, the guide pins 106 are inserted into the guide pin insertion holes 104 of one multifiber optical connector plug assembly first, until the tip ends of the guide pins 106 are held by the guide pin holding holes 131 of the guide pin holding member 130. Then, this multifiber optical connector plug assembly is inserted into one opening of an adaptor until hook members provided on the adaptor are engaged with engagement grooves 129 formed on the front housing 127 of this multifiber optical connector plug assembly.

Then, another multifiber optical connector plug assembly is inserted into another opening of the adaptor until another hook members provided on the adaptor are engaged with engagement grooves formed on the front housing of this another multifiber optical connector plug assembly. Here, the guide pins 106 are also inserted into the guide pin insertion holes of this another multifiber optical connector plug assembly, such that the alignment of the optical fibers housed inside the multifiber optical connector plug assemblies can be provided by guide pins 106.

In a case of reconnection or switching, the detachment of the multifiber optical connector plug assemblies is achieved by releasing the engagement of the hook members of the adaptor with the engagement grooves of the multifiber optical connector plug assemblies, and pulling the multifiber optical connector plug assemblies out of the adaptor.

Also, the holding force F to be exerted onto the guide pins 106 by the guide pin holding member 130 is set to be larger than the force F1 required for pulling one of the guide pins out of the multifiber optical connector plug assembly in a state in which the multifiber optical connector plug assemblies are connected together, such that the guide pins 106 are still held by the guide pin holding member 130 of one multifiber optical connector plug assembly after the disconnection operation, so as to prevent the undesirable dropping of the guide pins 106 off the multifiber optical connector plug assembly.

Also, the holding force F to be exerted onto the guide pins 106 by the guide pin holding member 130 is set to be smaller than the pressing force F2 exerted by the spring member 126, such that when the guide pins 106 are thrusted into the guide pin holding holes 131 through the guide pin insertion holes 104, the guide pins 106 can be smoothly inserted into the guide pin holding holes 131 without pushing the guide pin holding member 130 toward the spring member 126.

Thus, the holding force F is set to satisfy the relationship of F1<F<F2. Such a setting of the holding force F can be made by adjusting the inner diameter of each of the guide pin holding holes 131 appropriately.

It should be obvious here that all the advantages of the connector plug configuration shown in FIG. 12 to FIG. 14 can be retained in this multifiber optical connector as well.

Thus, according to this third embodiment, it becomes possible to provide a multifiber optical connector capable of realizing a stable connection characteristic of low reflection and low insertion loss, without using the refractive index matching material.

In addition, according to this third embodiment, it becomes possible to provide a multifiber optical connector capable of realizing an improved maneuverability in the connection and reconnection operations.

It is to be noted that in this third embodiment of the multifiber optical connector, the push-on type coupling structure employed in the connector plug case 118 and the adaptor 122 may be replaced by the other known coupling structure such as a screw coupling structure or a bayonet coupling structure.

Now, the results of the experiments conducted by the present inventors using actual implementations of various embodiments described above will be described.

First, the multifiber optical connector plug of the first embodiment shown in FIG. 12 to FIG. 14 was constructed as follows.

Namely, a four-fiber optical connector plug was constructed by using an optical fiber ribbon containing four single mode optical fibers of 1.3 $\mu$m wavelength which are transversely arranged at 0.25 mm interval between adjacent ones. The outer diameter of each optical fiber was 125 $\mu$m, and the mode field diameter was 9.5 $\mu$m. The connector plug member having a pair of guide pin insertion holes and four optical fiber holes was formed by the plastic molding using epoxy resin. After the optical fibers were inserted into the optical fiber holes and fixed with adhesive therein, the oblique polishing process was applied onto the connecting facet of the connector plug member to form an oblique surface which is inclined with respect to the optical axes of the optical fibers by an angle of 8 degrees which is larger than the total reflection critical angle of the light beam transmitted through the optical fibers. The cross sectional size of the connecting facet was 7 mm×3 mm. Then, the buffing polishing process was applied onto the obtained oblique surface to form the projections of the optical fibers by the length approximately equal to 1% of the outer diameter of the optical fibers.

Using the four-fiber optical connector plugs so constructed, the reflection power and the connection loss were measured when each of these plugs are connected with a preselected reference plug, with the force of approximately 1 Kgf applied in the axial direction and without using the refractive index matching material. The result is that, for 32 optical fibers in total, the reflection was −59 dB on average and −55 dB at maximum, while the connection loss was 0.2 dB on average and 0.6 dB at maximum.

In addition, the reflection power and the connection loss were measured when each of these plugs are connected with a preselected reference plug, with the refractive index matching material provided therebetween, and the result was compared with the result obtained for a case of not using refractive index matching material. The result is that the difference in the reflection was below 1 dB, and the difference in the connection loss was below 0.1 dB, so that a significant difference in the characteristics between the presence and absence of the refractive index matching material was not found within the range of the measurement error. This implies that it was actually possible to obtain the direct contacts of the optical fibers in the four-fiber optical connector plugs according to the present invention.

Furthermore, the variation of the connection loss was measured for the connection and reconnection operations repeated 100 times. The result is that the variation was below 0.1 dB, and no damage was found on the endfaces of the optical fibers.

Thus, it was experimentally verified that the first embodiment of the multifiber optical connector plug according to the present invention is indeed capable of realizing a stable connection characteristic of low reflection and low insertion loss, without using the refractive index matching material.

Next, the similar experiment was also carried out for the multifiber optical connector plug of the fourth embodiment shown in FIG. 22 and FIG. 23, which was constructed as follows.

Here, the four-fiber optical connector plug was constructed in a manner similar to that described above for the experiment for the first embodiment. In this case, however, the silica filled epoxy which has the Young's modulus equal to 15 GPa was used in the plastic molding of the connector plug member, and after the oblique polishing of the connecting facet, the buffing polishing was applied by using the free abrasive grains on the plastic sheet polishing disk. The buffing polishing conditions were set to obtain the convex ellipsoidal surface with the transverse radius of curvature equal to approximately 1000 mm, the longitudinal radius of curvature equal to approximately 100 to 200 mm, and the projections of the optical fibers by the length approximately equal to 1% of the outer diameter of the optical fibers.

The results similar to those described above for the experiment for the first embodiment were also obtained by using the four-fiber optical connector plugs of the fourth embodiment so constructed.

Thus, it was also experimentally verified that the fourth embodiment of the multifiber optical connector plug according to the present invention is indeed capable of realizing a stable connection characteristic of low reflection and low insertion loss, without using the refractive index matching material.

Next, the similar experiment was also carried out for the multifiber optical connector of the first embodiment shown in FIG. 24 and FIG. 25, which was constructed as follows.

Here, the four-fiber optical connector plug was constructed in a manner similar to that described above for the experiment for the first embodiment of the multifiber optical connector plug. In constructing the multifiber optical connector, the guide sleeve made of stainless steel and the clamp spring member made of stainless steel plate spring were used.

The result of the measurement of the reflection power and the connection loss is that, for 60 optical fibers in total, the reflection was −59 dB on average and −55 dB at maximum, while the connection loss was 0.3 dB on average and 0.7 dB at maximum.

Also, the result of the comparison of the characteristics between the presence and absence of the refractive index matching material is that the difference in the reflection was below 1 dB, and the difference in the connection loss was below 0.1 dB, so that a significant difference in the characteristics between the presence and absence of the refractive index matching material was not found within the range of the measurement error. This implies that it was actually possible to obtain the direct contacts of the optical fibers in the four-fiber optical connector according to the present invention.

Furthermore, the variation of the connection loss was measured for the connection and reconnection operations repeated 500 times. The result is that the variation was below 0.15 dB, and no damage was found on the endfaces of the optical fibers.

In addition, the vibration test and the impact test were conducted to check the stability of the direct contact between the optical fibers under the externally applied force. In the vibration test, the connector formed by such four-fiber optical connector plugs was subjected under the vibrations of 10 to 55 Hz frequency, 1.5 mm total amplitude, in three mutually perpendicular directions, for 2 hours per each direction. In the impact test, the connector formed by such four-fiber optical connector plugs was subjected under the impacts of 100 G in acceleration, 6 ms of application duration, in three mutually perpendicular direction, for three times per each direction. The result is that the variation of the connection loss was below 0.03 dB at maximum, which is within the range of the measurement error.

Thus, it was also experimentally verified that the first embodiment of the multifiber optical connector according to the present invention is indeed capable of realizing a stable connection characteristic of low reflection and low insertion loss, without using the refractive index matching material.

Next, the following experiments were carried out for the multifiber optical connector of the third embodiment using the multifiber optical connector plug assemblies of a type shown in FIG. 29 and FIG. 30.

Here, the four-fiber optical connector ferrule was constructed in a manner similar to that described above for the four-fiber optical connector plug used in the experiment for the first embodiment of the multifiber optical connector plug. Then, the force F1 required for pulling out one guide pin of 0.7 mm outer diameter from the four-fiber optical connector ferrule so constructed was measured to be approximately 0.2 Kgf at maximum.

Next, in order to use the coil spring member which exerts the force F2 of approximately 1 Kgf in the axial direction, the guide pin holding member is formed by the plastic molding such that each of the guide pin holding holes has the inner diameter capable of producing the holding force F equal to approximately 0.5 Kgf, so as to satisfy the relationship of F1<F<F2. It was sufficient for the inner diameter of each of the guide pin holding holes to be smaller than the outer diameter of each of the guide pins by approximately 5%.

Next, the multifiber optical connector plug assembly shown in FIG. 29 and FIG. 30 was constructed by using the above described four-fiber optical connector ferrule and the guide pin holding member, and the connection and reconnection operations were repeated for 500 times. In this test, the dropping of the guide pins off the connector plug assembly did not occur, so that it was experimentally verified that the guide pins are indeed held by the guide pin holding member after the disconnection operation.

Also, after these connection and reconnection operations were repeated for 500 times, the force F1 required in pulling out one of the guide pins from the connector plug assembly was measured again. In the test, the force F1 was found to be approximately equal to the force F1 measured earlier, so that it was experimentally verified that the holding force of the guide pin holding member is stable with respect to the repeated connection and reconnection operations.

It is to be noted that the multifiber optical connector plug with a stable connection characteristic of low reflection and low insertion loss according to the present invention as described above is particularly effective in the optical fiber connections utilized in the subscriber optical line system and the optical local network system.

It is also to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. A multifiber optical connector plug, comprising:
   a plurality of optical fibers; and
   a connector plug member made of a plastic material, having a connecting facet on which endfaces of the optical fibers to be connected with other optical fibers are arranged with the endfaces of the optical fibers projecting out of the connecting facet, the connecting facet being inclined with respect to an axial direction along optical axes of the optical fibers by an angle which is larger than a total reflection critical angle of light beams transmitted through the optical fibers, and the connector plug member further including guide pin insertion holes located on the connecting facet for receiving guide pins for aligning the multifiber optical connector plug with another multifiber optical connector plug, where the optical fibers are arranged on the connecting facet between the guide pin insertion holes along a transverse direction.

2. The multifiber optical connector plug of claim 1, wherein the connecting facet comprises a central protruded portion surrounding the optical fibers which has an area smaller than that of the connecting facet as a whole, and peripheral protruded portions surrounding the guide pin insertion holes, where both facets of the central and peripheral protruded portions are inclined with respect to the optical axes of the optical fibers by the angle which is larger than the total reflection critical angle of light beams transmitted through the optical fibers.

3. The multifiber optical connector plug of claim 1, wherein the connector plug member further includes a guide pin holding means located on a rear side of the connector plug member opposite to the connecting facet, for holding the guide pins which are inserted into the guide pin insertion holes and projecting out of the connector plug member toward the rear side.

4. The multifiber optical connector plug of claim 3, further comprising spring means for pressing the multifiber optical connector plug toward another multifiber optical connector plug in the axial direction, and wherein the guide pin holding means holds the guide pins by a holding force F which satisfies a relationship of $F1 < F < F2$, where F1 is a force required for pulling out one of the guide pins in a state in which the multifiber optical connector plug is connected with another multifiber optical connector plug by using the guide pins, and F2 is a force exerted by the spring means in the axial direction.

5. The multifiber optical connector plug of claim 4, wherein the guide pin holding means includes guide pin holding holes, each guide pin holding hole having an inner diameter smaller than an outer diameter of each of the guide pins, and a slit for splitting a circumference of said each guide pin holding hole.

6. The multifiber optical connector plug of claim 1, wherein the endfaces of the optical fibers are projecting out of the connecting facet by a length which is significantly shorter than an outer diameter of each of the optical fibers.

7. The multifiber optical connector plug of claim 1, wherein the connecting facet has a flat surface shape.

8. The multifiber optical connector plug of claim 1, wherein the connecting facet has a convex ellipsoidal surface shape.

9. The multifiber optical connector plug of claim 8, wherein the convex ellipsoidal surface shape of the connecting facet has a maximum radius of curvature in the transverse direction at a center of the connecting facet and a minimum radius of curvature in a direction perpendicular to the transverse direction at the center of the connecting facet.

10. The multifiber optical connector plug of claim 8, wherein the convex ellipsoidal surface shape of the connecting facet has a transverse radius of curvature R1 ($0 < R1 < \infty$) in a transverse direction at a center of the connecting facet and a longitudinal radius of curvature R2 ($0 < R2 < \infty$) in a longitudinal direction at the center of the connecting facet.

11. The multifiber optical connector plug of claim 8, wherein the plastic material from which the connector plug member is made is an elastic material having a Young's modulus not greater than 30 GPa.

12. The multifiber optical connector plug of claim 11, further comprising spring means for pressing the multifiber optical connector plug toward another multifiber optical connector plug in the axial direction in a state in which the multifiber optical connector plug is connected with said another multifiber optical connector plug, such that an elliptical contact region surrounding the optical fibers is formed on the connecting facet by an elastic deformation of the elastic material from which the connector plug member is made.

13. A multifiber optical connector plug, comprising:
a plurality of optical fibers; and
a connector plug member made of an elastic material, having a connecting facet on which endfaces of the optical fibers to be connected with other optical fibers are arranged, the connecting facet being inclined with respect to an axial direction along optical axes of the optical fibers by an angle which is larger than a total reflection critical angle of light beams transmitted through the optical fibers, the connecting facet having a convex ellipsoidal surface shape, and the connector plug member further including guide pin insertion holes located on the connecting facet for receiving guide pins for aligning the multifiber optical connector plug with another multifiber optical connector plug, where the optical fibers are arranged on the connecting facet between the guide pin insertion holes along a transverse direction.

14. The multifiber optical connector plug of claim 13, wherein the convex ellipsoidal surface shape of the connecting facet has a maximum radius of curvature in the transverse direction at a center of the connecting facet and a minimum radius of curvature in a direction perpendicular to the transverse direction at the center of the connecting facet.

15. The multifiber optical connector plug of claim 13, wherein the convex ellipsoidal surface shape of the connecting facet has a transverse radius of curvature R1 ($0 < R1 < \infty$) in a transverse direction at a center of the connecting facet and a longitudinal radius of curvature R2 ($0 < R2 < \infty$) in a longitudinal direction at the center of the connecting facet.

16. The multifiber optical connector plug of claim 13, wherein the elastic material from which the connector plug member is made has a Young's modulus not greater than 30 GPa.

17. The multifiber optical connector plug of claim 16, further comprising spring means for pressing the multifiber optical connector plug toward another multifiber optical connector plug in the axial direction in a state in which the multifiber optical connector plug is connected with said another multifiber optical connector plug, such that an elliptical contact region surrounding the optical fibers is formed on the connecting facet by an elastic deformation of the elastic material from which the connector plug member is made.

18. A multifiber optical connector, comprising:
a pair of multifiber optical connector plugs, each multifiber optical connector plug comprising:
a plurality of optical fibers; and
a connector ferrule having a connecting facet on which endfaces of the optical fibers to be connected with other optical fibers are arranged with the endfaces of the optical fibers projecting out of the connecting facet, the connecting facet being inclined with respect to an axial direction along optical axes of the optical fibers by an angle which is larger than a total reflection critical angle of light beams transmitted through the optical fibers, and the connector plug member further including guide pin insertion holes located on the connecting facet, where the optical fibers are arranged on the connecting facet between the guide pin insertion holes along a transverse direction; and
spring means for pressing said pair of multifiber optical connector plugs toward each other in the axial direction; and
guide pins, inserted into the guide pin insertion holes of the connector ferrule, for aligning said pair of multifiber optical connector plugs.

19. The multifiber optical connector plug of claim 18, wherein each of said pair of multifiber optical connector plug further including guide pin holding means located on a rear side of the connector plug member opposite to the connecting facet, for holding the guide pins which are inserted into the guide pin insertion holes and projecting out of the multifiber optical connector plug toward the rear side.

20. The multifiber optical connector plug of claim 19, wherein the guide pin holding means holds the guide pins by a holding force F which satisfies a relationship of $F1 < F < F2$, where F1 is a force required for pulling out one of the guide pins in a state in which said pair of multifiber optical connector plugs are connected with each other by using the guide pins, and F2 is a force exerted by the spring means in the axial direction.

21. The multifiber optical connector plug of claim 20, wherein the guide pin holding means includes guide pin holding holes, each guide pin holding hole having an inner diameter smaller than an outer diameter of each of the guide pins, and a slit for splitting a circumference of said each guide pin holding hole.

22. The multifiber optical connector plug of claim 18, further comprising guide sleeve means for holding said pair of multifiber optical connector plugs together such that the connecting facets of said pair of multifiber optical connector plugs are connected together inside the guide sleeve means.

23. The multifiber optical connector plug of claim 22, wherein the guide sleeve means has an inner opening size which is larger than a size of the connecting facet and widening toward edges of the guide sleeve means, and which further comprises an adaptor housing which houses the guide sleeve means, the adaptor housing having a first inner opening size which is larger than an outer size of the guide sleeve means in a vicinity of a location of the guide sleeve means inside the adaptor housing, and a second inner opening size which is larger than an inner opening size of the guide sleeve means but smaller than the outer size of the guide sleeve means in regions other than said vicinity of the location of the guide sleeve means inside the adaptor housing.

* * * * *